(12) United States Patent  
Milam et al.

(10) Patent No.: US 9,600,114 B2  
(45) Date of Patent: Mar. 21, 2017

(54) VARIABLE PRESSURE TOUCH SYSTEM

(71) Applicant: International Business Machines Corporation, Armonk, NY (US)

(72) Inventors: Jennifer L Milam, San Bruno, CA (US); Pamela A Nesbitt, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 14/447,623

(22) Filed: Jul. 31, 2014

(65) Prior Publication Data

US 2016/0034086 A1    Feb. 4, 2016

(51) Int. Cl.  
*G06F 3/0488* (2013.01)  
*G06F 3/041* (2006.01)

(52) U.S. Cl.  
CPC .......... *G06F 3/0414* (2013.01); *G06F 3/0488* (2013.01)

(58) Field of Classification Search  
CPC .... G06F 3/0414; G06F 3/0488; G06F 3/0418; G06F 3/04883; G06F 3/044; G06F 2203/04101; G06F 2203/04808  
See application file for complete search history.

(56) References Cited

U.S. PATENT DOCUMENTS

| | | | | |
|---|---|---|---|---|
| 8,294,018 | B2 * | 10/2012 | Wang | G06F 1/1626 84/615 |
| 9,030,419 | B1 * | 5/2015 | Freed | G06F 3/0416 345/156 |
| 2006/0001654 | A1 | 1/2006 | Smits | |
| 2008/0204427 | A1 * | 8/2008 | Heesemans | G06F 3/0414 345/174 |

(Continued)

FOREIGN PATENT DOCUMENTS

| | | |
|---|---|---|
| EP | 595746 A1 | 5/1994 |
| WO | WO2008019321 A2 | 2/2008 |
| WO | WO2014018268 A1 | 1/2014 |

OTHER PUBLICATIONS

RAMOS—"Fluid Interaction Techniques for the Control and Annotation of Digital Video" UIST '03 Vancouver, BC, Canada, Copyright 2003.  
IPCOM1—"System and Method for Analysing Data Records Utilizing a Touch Screen Interface", IP.com No. IPCOM000203428D; Jan. 24, 2011.

(Continued)

*Primary Examiner* — Kumar Patel  
*Assistant Examiner* — Amy C Onyekaba  
(74) *Attorney, Agent, or Firm* — Steven J. Walder, Jr.; Steve Kurlowecz

(57) ABSTRACT

The disclosed variable pressure touch system includes an information handling system (IHS) that may take many forms. In one embodiment, the IHS may be a tablet with a touch sensor in the form of a touch sensitive display. A user may apply pressure to the touch sensor with a finger, stylus, or other pointing device. The touch sensor may then generate a current pressure indication of the current pressure exhibited by the touch on the touch sensor. In one embodiment, a touch tool of the IHS may receive the current pressure indication and generate a display image on the display of the IHS that changes as the current pressure indication changes. In other embodiments, the touch tool of the IHS may receive the current pressure indication and generate a visual indicator on the display of the IHS that changes as the current pressure indication changes.

12 Claims, 17 Drawing Sheets

(56) References Cited

U.S. PATENT DOCUMENTS

| | | | |
|---|---|---|---|
| 2010/0153879 A1* | 6/2010 | Rimas-Ribikauskas | G06F 3/0488 715/810 |
| 2012/0054665 A1* | 3/2012 | Kano | G06F 3/04883 715/776 |
| 2012/0306766 A1* | 12/2012 | Moore | G06F 3/04883 345/173 |
| 2014/0028575 A1 | 1/2014 | Parivar | |
| 2015/0067601 A1* | 3/2015 | Bernstein | G06F 3/0488 715/823 |

OTHER PUBLICATIONS

IPCOM2—"Initialization of a Multi Touchscreen Device via Gesture", IP.com No. IPCOM000212632D, Nov. 21, 2011.
Ramos, Gonzalo et al., "Zliding: Fluid Zooming and Sliding for High Precision Parameter Manipulation", UIST'05, http://www.dgp.toronto.edu/papers/gramos_UIST2005.pdf, Seattle, Washington, Oct. 23-27, 2005, pp. 143-152.

* cited by examiner

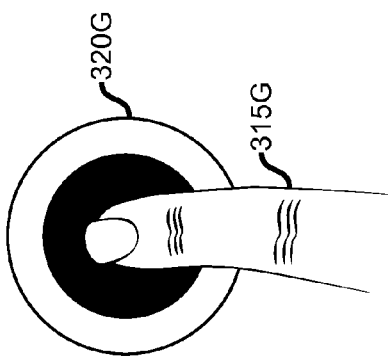
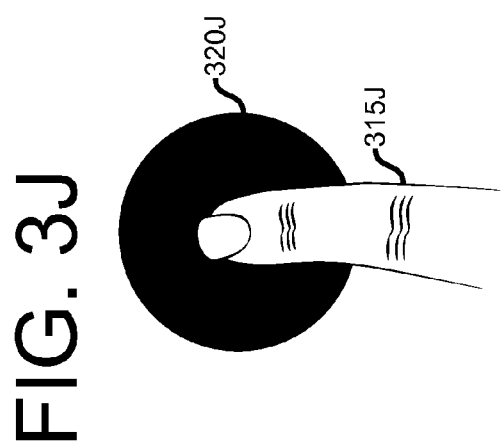
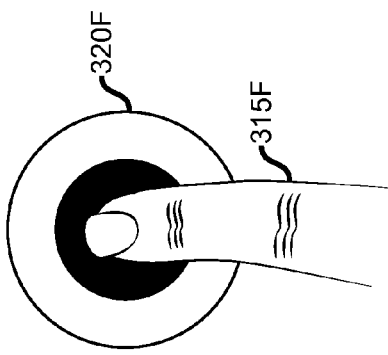
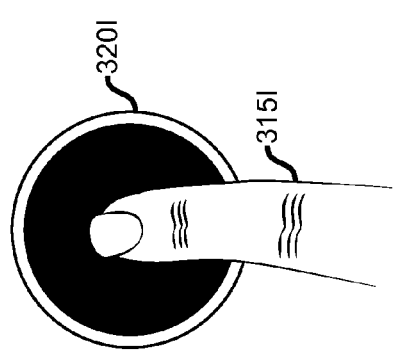
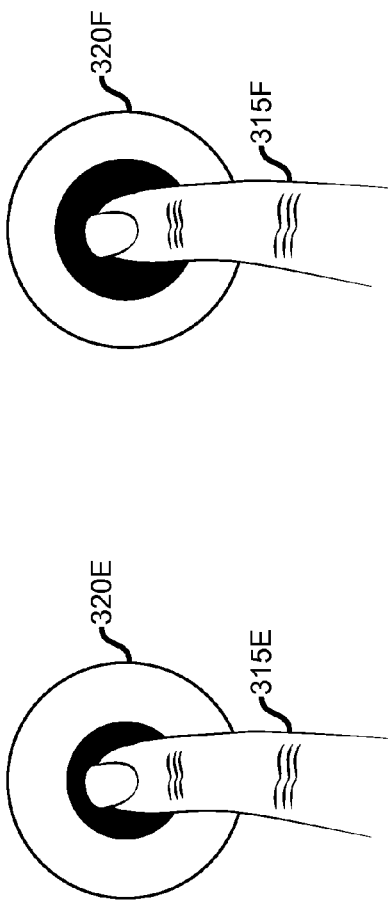
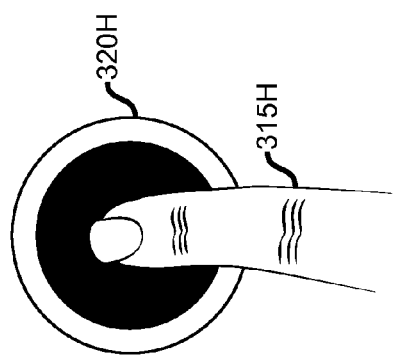

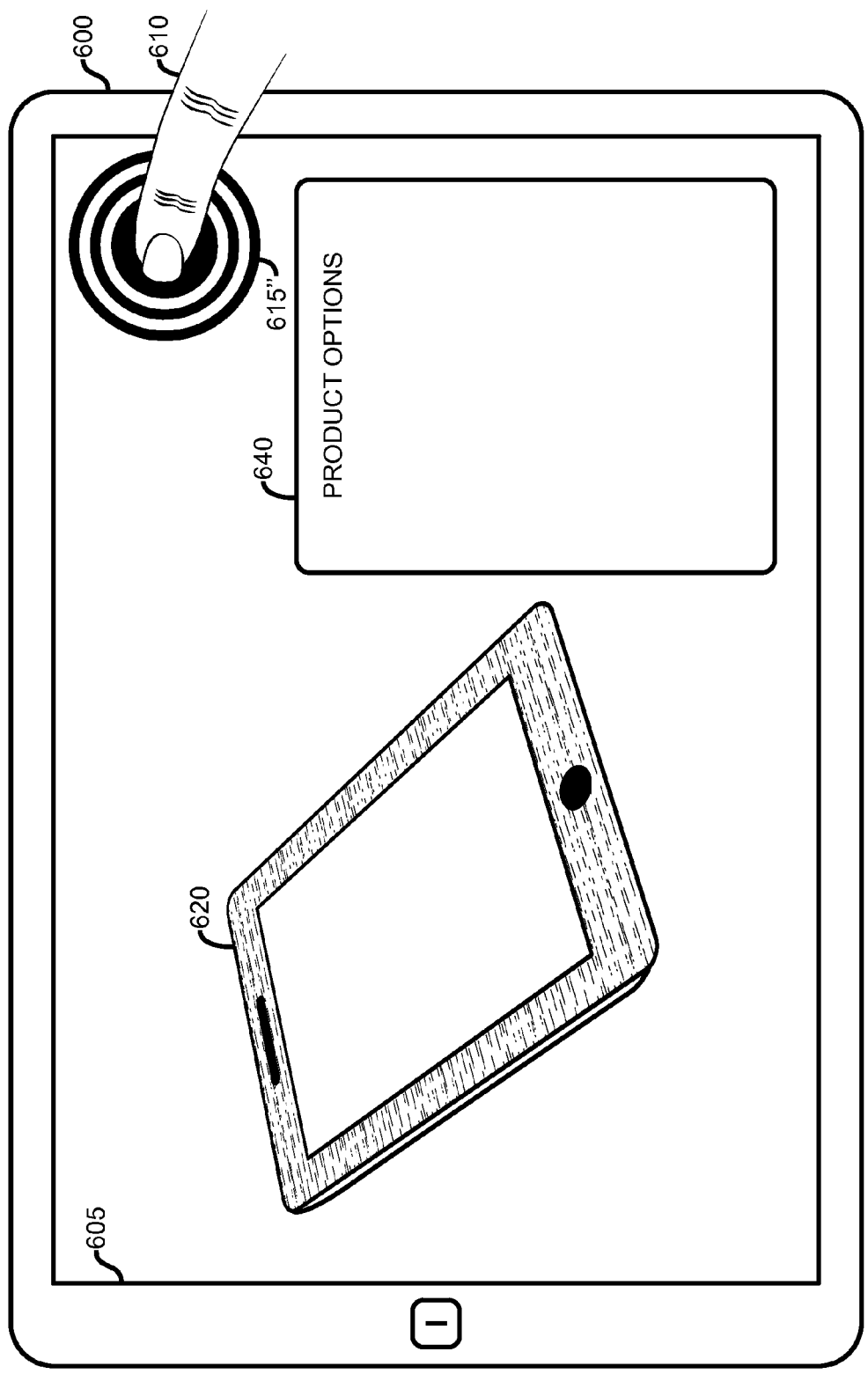

9,600,114 B2

VARIABLE PRESSURE TOUCH SYSTEM

BACKGROUND

The disclosures herein relate generally to information handling systems (IHSs), and more specifically, to IHSs that receive signals from user input devices. IHSs may utilize user input devices to interpret user actions. User input devices may include touch sensitive devices such as touchscreens, trackpads and other touch sensitive user input devices that allow the user to interact with the IHS.

BRIEF SUMMARY

In one embodiment, a method of responsive variable touch in a variable pressure touch system is disclosed. The method includes sensing a touch by a touch sensor of an information handling system (IHS). The method also includes generating, by the touch sensor, a current pressure indication of current pressure exhibited by the touch on the touch sensor. The method further includes receiving, by a touch tool of the IHS, the current pressure indication. The method still further includes generating, by the touch tool of the IHS, a display image that changes as the current pressure indication changes. The method also includes displaying, by a display of the IHS, the display image that changes as the current pressure indication changes.

In another embodiment, an information handling system (IHS) is disclosed. The IHS includes a processor. The IHS also includes a system memory coupled to the processor. The system memory includes a touch tool that is configured to sense a touch by a touch sensor. The touch tool is also configured to generate a current pressure indication of current pressure exhibited by the touch on the touch sensor. The touch tool is further configured to receive the current pressure indication. The touch tool is still further configured to generate a display image that changes as the current pressure indication changes. The touch tool is also configured to display the display image that changes as the current pressure indication changes In yet another embodiment, a touch tool computer program product is disclosed. The touch tool computer program product includes a non-transitory computer readable storage medium. The touch tool computer program product also includes first instructions that sense a touch by a touch sensor. The touch tool computer program product further includes second instructions that generate a current pressure indication of current pressure exhibited by the touch on the touch sensor. The touch tool computer program product still further includes third instructions that receive the current pressure indication. The touch tool computer program product also includes fourth instructions that generate a display image that changes as the current pressure indication changes. The touch tool computer program product further includes fifth instructions that display a display image that changes as the current pressure indication changes. The first, second, third, fourth and fifth instructions are stored on the non-transitory computer readable storage medium.

BRIEF DESCRIPTION OF THE DRAWINGS

The appended drawings illustrate only exemplary embodiments of the invention and therefore do not limit its scope because the inventive concepts lend themselves to other equally effective embodiments.

FIGS. 3E-3J are illustrative examples of another embodiment of a visual indicator that the disclosed system may employ, wherein different touch pressures result in different displayed detail levels.

FIGS. 6A-6D are block diagrams of one embodiment of the disclosed variable pressure touch system where the detail level is exclusive of other detail levels.

DETAILED DESCRIPTION

The disclosed variable pressure touch system includes an information handling system (IHS) that may take many forms. In one embodiment, the IHS may be a tablet with a touch sensor in the form of a touch sensitive display. A user may apply pressure to the touch sensor with a finger, stylus, or other pointing device. The touch sensor may then generate a current pressure indication of the current pressure exhibited by the touch on the touch sensor. In one embodiment, a touch tool of the IHS may receive the current pressure indication and generate a display image on the display of the IHS that changes as the current pressure indication changes. In other embodiments, the touch tool of the IHS may receive the current pressure indication and generate a visual indicator on the display of the IHS that changes as the current pressure indication changes.

Figure 1A:
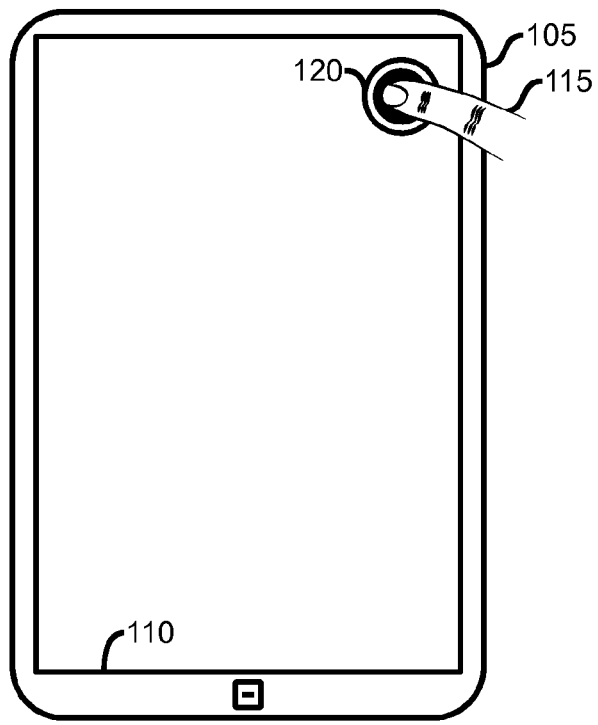
FIGS. 1A-1C are block diagrams showing embodiments of the disclosed variable pressure touch system.
Figure 1B:
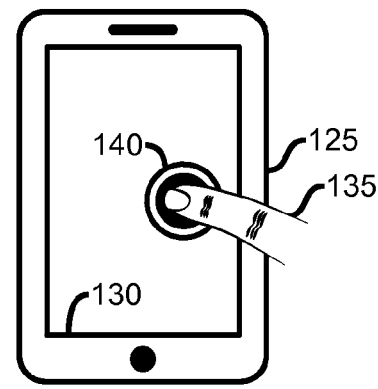
Figure 1C:
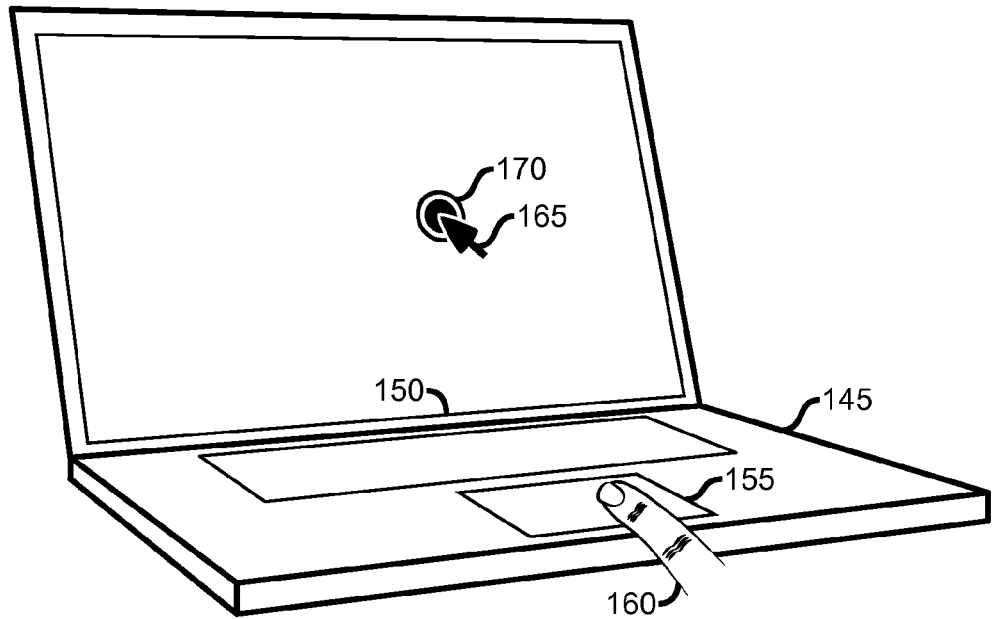

FIGS. 1A-1C are block diagrams showing embodiments of the disclosed variable pressure touch system. FIG. 1A is a block diagram of one embodiment of an IHS in the disclosed variable pressure touch system, namely a tablet 105 with a touchscreen display 110. Touchscreen display 110 may include both a touch sensor and a display that are combined to form the touchscreen display. The touch sensor is included in touchscreen display 110 and is not separately shown. In one embodiment, a user may press on touchscreen display 110 with a finger 115. In other words, the user may touch the touch sensor in touchscreen display 110 with finger 115 as shown. In other embodiments, finger 115 may be a stylus or other implement with which force may be applied to touchscreen display 110. The touch sensor of touchscreen display 110 may generate a current pressure indication of the current pressure exhibited by the touch of finger 115 on the touch sensor of touchscreen display 110. A touch tool 800 of tablet 105, as discussed in more detail below, may receive the current pressure indication from the touch sensor of the touchscreen display 110.

Touch tool 800 (shown in FIG. 2) may change the display of touchscreen display 110 as the user changes the pressure of finger 115 on touchscreen display 110. In one embodiment, the position of visual indicator 120 on the display of touchscreen display 110 may correspond with the changes in position of finger 115 on touchscreen display 110. Touch tool 800 may generate and display visual indicator 120 on the display of touchscreen display 110 and change visual indicator 120 in response to the current pressure indication of the current pressure exhibited by the touch of finger 115 on the touch sensor of touchscreen display 110.

FIG. 1B is a block diagram of another embodiment of an IHS in the disclosed variable pressure touch system, namely smartphone 125 with a touchscreen display 130. Touchscreen display 130 may include a touch sensor and a display that are combined to form the touchscreen display 130. In one embodiment, a user may press on touchscreen display 130 with a finger 135. In other words, the user may touch the touch sensor in touchscreen display 130 with finger 135. In other embodiments, finger 135 may be a stylus or other implement with which force may be applied to touchscreen display 130. The touch sensor of touchscreen display 130 may generate a current pressure indication of the current pressure exhibited by the touch of finger 135 on the touch sensor of touchscreen display 130.

A touch tool 800 of smartphone 125, as discussed in more detail below, may receive the current pressure indication from the touch sensor of the touchscreen display 125. The display of touchscreen display 130 may change as the user changes the pressure of finger 135 on touchscreen display 130. In one embodiment, the position of visual indicator 140 on the display of touchscreen display 130 may correspond with the changes in position of finger 135 on touchscreen display 130. Touch tool 800 may generate and display visual indicator 140 on the display of touchscreen display 130 and change visual indicator 140 in response to the current pressure indication of the current pressure exhibited by the touch of finger 135 on the touch sensor of touchscreen display 130.

FIG. 1C is a block diagram of one embodiment of an IHS in the disclosed variable pressure touch system, namely a laptop 145 with a display 150. Laptop 145 may include a trackpad 155. Trackpad 155 may include a touch sensor. In one embodiment, a user may press on trackpad 155 with a finger 160. In other words, the user may touch the touch sensor in trackpad 155 with finger 160. In other embodiments, finger 160 may be a stylus or other implement with which force may be applied to trackpad 155. The touch sensor of trackpad 155 may generate a current pressure indication of the current pressure exhibited by the touch of finger 160 on the touch sensor of trackpad 155. A touch tool 800 of laptop 145, as discussed in more detail below, may receive the current pressure indication from the touch sensor of trackpad 155. Touch tool 800 may change the display 150 of laptop 145 as the user changes the pressure of finger 160 on trackpad 155.

In one embodiment, the position of cursor 165 on display 150 may correspond with the changes in position of finger 160 on trackpad 155. In another embodiment, the position of visual indicator 170 on display 150 may correspond with the changes in position of cursor 165 on display 150. In yet another embodiment, the position of visual indicator 170 on display 150 may correspond with the changes in position of finger 160 on trackpad 155. Touch tool 800 may generate and display visual indicator 170 on display 150 and change visual indicator 170 in response to the current pressure indication of the current pressure exhibited by the touch of finger 160 on the touch sensor of trackpad 155.

Figure 2:
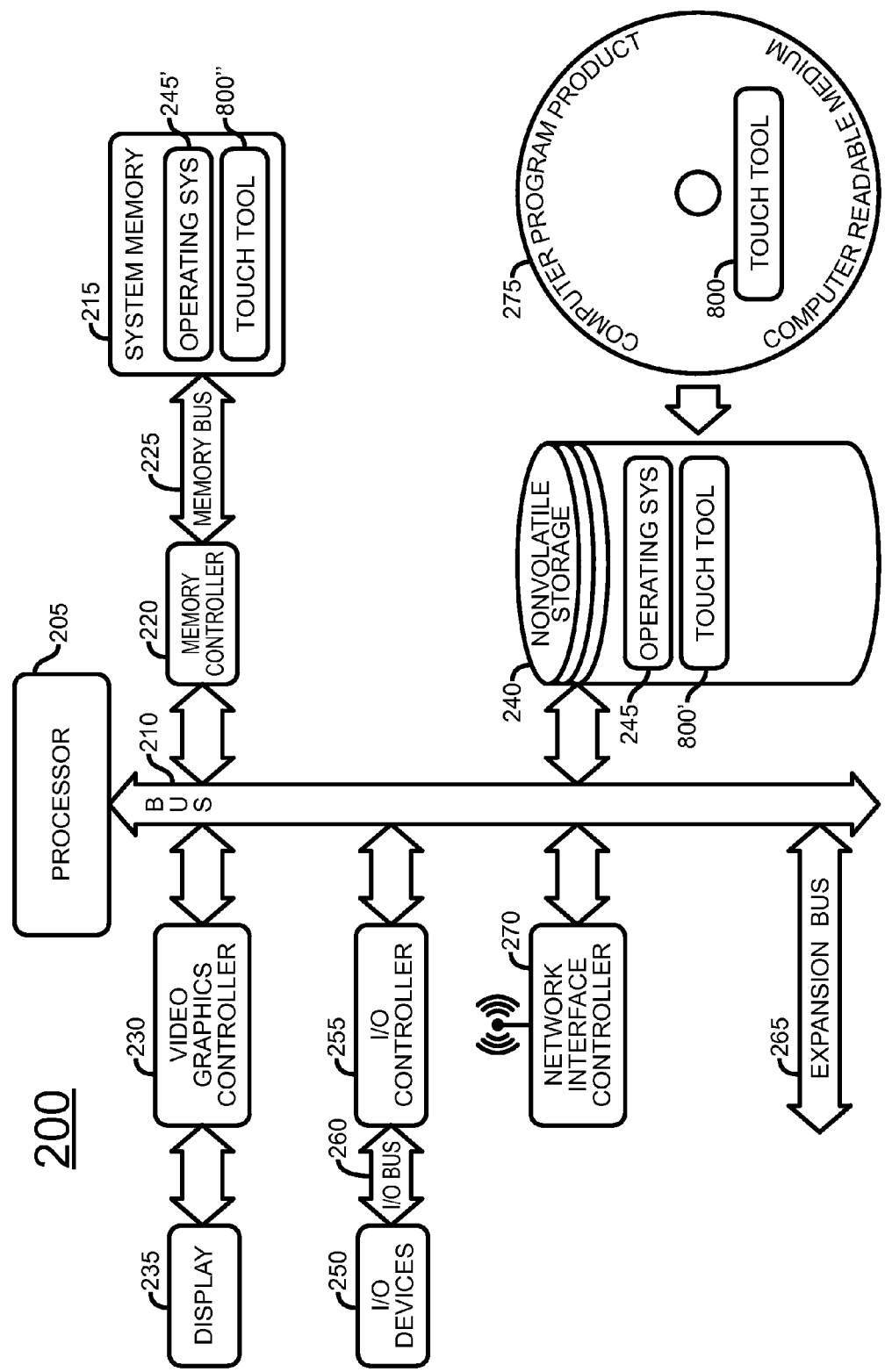
FIG. 2 is a block diagram of an information handling system (IHS) that may be used in the disclosed variable pressure touch system.

FIG. 2 is a block diagram of an information handling system (IHS) 200 that may be used in the disclosed variable pressure touch system. IHS 200 includes the above referenced touch tool 800 that is discussed in more detail below. IHS 200 includes a processor 205 that may include multiple cores. IHS 200 processes, transfers, communicates, modifies, stores or otherwise handles information in digital form, analog form or other form. IHS 200 includes a bus 210 that couples processor 205 to memory 215 via a memory controller 220 and memory bus 225. System memory 215 may also be referred to as main memory. System memory 215 may be a static random access memory (SRAM) array or a dynamic random access memory (DRAM) array. Processor 205 may also include local memory such as L1, L2 and L3 caches. A video graphics controller 230 couples display 235 to bus 210. Nonvolatile storage 240, such as a hard disk drive, solid-state drive (SSD), CD drive, DVD drive, or other nonvolatile storage couples to bus 210 to provide IHS 200 with permanent storage of information. System memory 215 and nonvolatile storage 240 are both forms of memory stores. Nonvolatile storage 240 stores an operating system 245 (OPERATING SYS) that governs operation of IHS 200. I/O devices 250, such as speakers, a keyboard and a pointing device, couple to bus 210 via I/O controller 255 and I/O bus 260. I/O devices 250 may also include variable pressure touch sensors, e.g., touchscreens and trackpads.

One or more expansion busses 265, such as USB, IEEE 1394 bus, ATA, SATA, PCI, PCIE, DVI, HDMI and other busses, couple to bus 210 to facilitate the connection of peripherals and devices to IHS 200. A network interface controller (NIC) 270 couples to bus 210 to enable IHS 200 to connect by wire or wirelessly to a network and other information handling systems. NIC 270 may also be called a network communication adapter, network interface adapter, network adapter, network interface or an adapter. While FIG. 2 shows one IHS that employs processor 205, the IHS may take many forms. For example, IHS 200 may take the form of a desktop, portable, laptop, notebook, tablet or other form factor computer or data processing system. IHS 200 may take other form factors such as a gaming device, a personal digital assistant (PDA), a portable telephone device, a communication device or other devices that include a processor and memory.

IHS 200 includes a touch tool computer program product 800 on digital media 275 such as a CD, DVD or other media. For simplicity, the term touch tool will be used below. IHS 200 may store touch tool 800 in nonvolatile storage 240 as touch tool 800'. IHS 200 may also store operating system 245 (OPERATING SYS) in nonvolatile storage 240. When IHS 200 initializes, the IHS loads operating system 245 into system memory 215 for execution as operating system 245'. IHS 200 also loads touch tool 800' into system memory 215 for execution as touch tool 800".

FIGS. 3A-3D are illustrative examples of one embodiment of a visual indicator that displays a detail level related to finger touch pressure. In one embodiment of the disclosed methodology, there may be a plurality of detail levels, where particular detail levels correspond to particular pressure ranges. When speaking of pressure, it should be understood that reference is being made to the amount of pressure that a user exerts with a finger, stylus or other pointing device on a touch sensor. An example of detail levels and corresponding normalized pressure ranges are shown below in TABLE 1.

TABLE 1

| Detail Level | Normalized Pressure Range |
| --- | --- |
| 0 | 0.0-0.1 |
| 1 | 0.1-0.3 |
| 2 | 0.3-0.6 |
| 3 | 0.6-1.0 |

The left column of TABLE 1 shows detail levels and the right column of TABLE 1 shows the normalized pressure range corresponding to each particular detail level. In this example, detail level 0 has a corresponding normalized pressure range greater than 0.0 but less than or equal to 0.1. If the current pressure indication is greater than 0.0 but less than or equal to 0.1, touch tool 800 may determine that the current pressure indication exhibits a detail level of 0. Detail level 1 has a normalized pressure range greater than 0.1 but less than or equal to 0.3. If the current pressure indication is greater than 0.1 but less than or equal to 0.3, touch tool 800 may determine that the current pressure indication exhibits a detail level of 1. Detail level 2 has a normalized pressure range greater than 0.3 but less than or equal to 0.6. If the current pressure indication is greater than 0.3 but less than or equal to 0.6, touch tool 800 may determine that the current pressure indication exhibits a detail level of 2. Detail level 3 has a normalized pressure range greater than 0.6 but less than or equal to 1.0. If the current pressure indication is greater than 0.6 but less than or equal to 1.0, touch tool 800 may determine that the current pressure indication exhibits a detail level of 3.

Figure 3B:
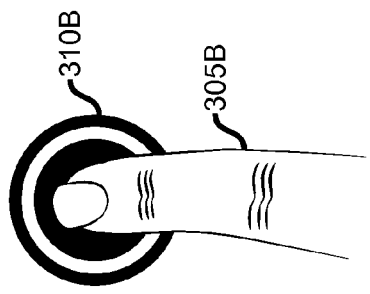
FIGS. 3A-3D are illustrative examples of an embodiment of a visual indicator that the disclosed system may employ, wherein different touch pressures result in different displayed detail levels.
Figure 3D:
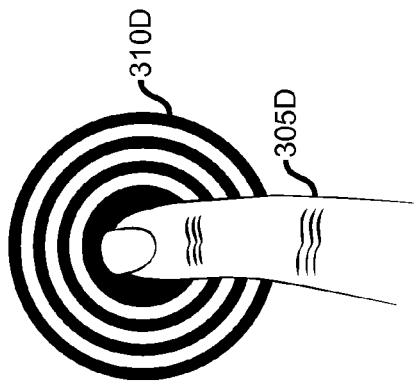
Figure 3A:
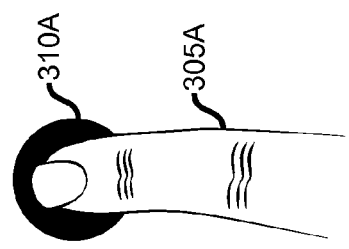

FIG. 3A is an illustrative example of one embodiment of a visual indicator in the disclosed variable pressure touch system. For example, when the IHS of FIG. 1A employs the visual indicator of FIG. 3A, a user may touch the touch sensor in touchscreen display 110 with finger 305A. The touch sensor of touchscreen display 110 may generate a current pressure indication of the current pressure exhibited by the touch of finger 305A on the touch sensor of touchscreen display 110. In this example, the touch sensor of touchscreen display 110 may generate a current pressure indication with a normalized current pressure value of 0.05. Touch tool 800 may receive the current pressure indication from the touch sensor of the touchscreen display 110.

Touch tool 800 may utilize the current pressure indication of 0.05 to determine a particular detail level of 0 from the plurality of detail levels for the touch of finger 305A on the touch sensor of touchscreen display 110, as shown in FIG. 3A. Touch tool 800 may generate a visual indicator 310A in response to the particular detail level determined. Touch tool 800 generates a visual indicator 310A that includes a solid circle that is not enclosed by any rings, adjacent to finger 305A, indicating a detail level of 0. Touch tool 800 may display visual indicator 310A that includes a solid circle adjacent to finger 305A on the display of touchscreen display 110, visually indicating to the user that the current pressure of finger 305A exhibits a detail level of 0.

FIG. 3B shows a changed visual indicator that the disclosed variable pressure touch system may render when the user touches the display with a higher pressure level than in FIG. 3A. For example, with respect to the IHS in FIG. 1A, in FIG. 3B a user may touch the touch sensor in touchscreen display 110 with finger 305B. The touch sensor of touchscreen display 110 may generate a current pressure indication of the current pressure exhibited by the touch of finger 305B on the touch sensor of touchscreen display 110. In this example, the touch sensor of touchscreen display 110 may generate a current pressure indication with a normalized current pressure value of 0.2. Touch tool 800 may receive the current pressure indication from the touch sensor of the touchscreen display 110.

Touch tool 800 may utilize the current pressure indication of 0.2 to determine a particular detail level of 1 from the plurality of detail levels for the touch of finger 305B on the touch sensor of touchscreen display 110, as shown in FIG. 3B. Touch tool 800 may generate a visual indicator 310B in response to the particular detail level determined. Touch tool 800 generates a visual indicator 310A that includes a solid circle enclosed by one ring, adjacent to finger 305B, indicating a detail level of 1. Touch tool 800 may display visual indicator 310B that includes a solid circle enclosed by one ring, adjacent to finger 305B on the display of touchscreen display 110, visually indicating to the user that the current pressure of finger 305B exhibits a detail level of 1.

Figure 3C:
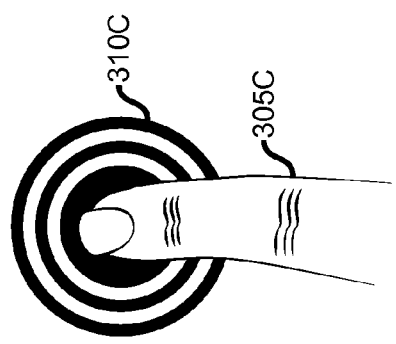

FIG. 3C shows a changed visual indicator that the disclosed variable pressure touch system may render when the user touches the display with an even higher pressure level than in FIG. 3B. For example, with respect to the IHS in FIG. 1A, in FIG. 3C a user may touch the touch sensor in touchscreen display 110 with finger 305C. The touch sensor of touchscreen display 110 may generate a current pressure indication of the current pressure exhibited by the touch of finger 305C on the touch sensor of touchscreen display 110. In this example, the touch sensor of touchscreen display 110 may generate a current pressure indication with a normalized current pressure value of 0.5. Touch tool 800 may receive the current pressure indication from the touch sensor of the touchscreen display 110.

Touch tool 800 may utilize the current pressure indication of 0.5 to determine a particular detail level of 2 from the plurality of detail levels for the touch of finger 305C on the touch sensor of touchscreen display 110, as shown in FIG. 3C. Touch tool 800 may generate a visual indicator 310C in response to the particular detail level determined. Touch tool 800 generates a visual indicator 310C that includes a solid circle enclosed by two rings, adjacent to finger 305C, indicating a detail level of 2. Touch tool 800 may display visual indicator 310C that includes a solid circle enclosed by two rings, adjacent to finger 305C on the display of touchscreen display 110, visually indicating to the user that the current pressure of finger 305C exhibits a detail level of 2.

FIG. 3D shows a changed visual indicator that the disclosed variable pressure touch system may render when the user touches the display with an even higher pressure level than in FIG. 3C discussed above. For example, with respect to the IHS in FIG. 1A, in FIG. 3D a user may touch the touch sensor in touchscreen display 110 with finger 305D. The touch sensor of touchscreen display 110 may generate a current pressure indication of the current pressure exhibited by the touch of finger 305D on the touch sensor of touchscreen display 110. In this example, the touch sensor of touchscreen display 110 may generate a current pressure indication with a normalized current pressure value of 0.75. Touch tool 800 may receive the current pressure indication from the touch sensor of the touchscreen display 110.

Touch tool 800 may utilize the current pressure indication of 0.75 to determine a particular detail level of 3 from the plurality of detail levels for the touch of finger 305D on the touch sensor of touchscreen display 110, as shown in FIG. 3D. Touch tool 800 may generate a visual indicator 310D in response to the particular detail level determined. Touch tool 800 generates a visual indicator 310D that includes a solid circle enclosed by three rings, adjacent to finger 305D, indicating a detail level of 3. Touch tool 800 may display visual indicator 310D that includes a solid circle enclosed by three rings, adjacent to finger 305D on the display of touchscreen display 110, visually indicating to the user that the current pressure of finger 305D exhibits a detail level of 3.

FIGS. 3E-3J are illustrative examples of another embodiment of a visual indicator that changes corresponding to the current pressure indication that results from finger touch pressure on the touchscreen.

FIG. 3E is an illustrative example of one embodiment of a visual indicator that may be employed in the disclosed variable pressure touch system. For example, when the IHS of FIG. 1A employs the visual indicator of FIG. 3E, a user may touch the touch sensor in touchscreen display 110 with finger 315E. In response, the touch sensor of touchscreen display 110 may generate a current pressure indication of the current pressure exhibited by the touch of finger 315E on the touch sensor of touchscreen display 110. In this example, the touch sensor of touchscreen display 110 may generate a current pressure indication with a normalized current pressure value of 0.5. In other words, the touch sensor of touchscreen display 110 is at 50% utilization. Touch tool 800 may receive the current pressure indication from the touch sensor of the touchscreen display 110.

Touch tool 800 may generate a visual indicator 320E in response to the current pressure indication that it receives from the touch sensor. Touch tool 800 generates a visual indicator 320E that includes a solid circle of radius 0.5 that is enclosed by a ring of radius 1.0, adjacent to finger 315E, indicating a current pressure level of 0.5. In this example, the radius values are relative to one another and are thus unitless. Touch tool 800 may display visual indicator 320E that includes a solid circle of radius 0.5 that is enclosed by a ring of radius 1.0, adjacent to finger 315E on the display of touchscreen display 110, visually indicating to the user that the current pressure of finger 315E exhibits a current pressure level of 0.5.

FIG. 3F shows a changed visual indicator that the disclosed variable pressure touch system my render when the user touches the display with a higher pressure level than in FIG. 3E. For example, with respect to the IHS in FIG. 1A, in FIG. 3F a user may touch the touch sensor in touchscreen display 110 with finger 315F. The touch sensor of touchscreen display 110 may generate a current pressure indication of the current pressure exhibited by the touch of finger 315F on the touch sensor of touchscreen display 110. In this example, the touch sensor of touchscreen display 110 may generate a current pressure indication with a normalized current pressure value of 0.6. In other words, the touch sensor of touchscreen display 110 is at 60% utilization. Touch tool 800 may receive the current pressure indication from the touch sensor of the touchscreen display 110.

Touch tool 800 may generate a visual indicator 320F in response to the current pressure indication. Touch tool 800 generates a visual indicator 320F that includes a solid circle of radius 0.6 that is enclosed by a ring of radius 1.0, adjacent to finger 315F, indicating a current pressure level of 0.6. Touch tool 800 may display visual indicator 320F that includes a solid circle of radius 0.6 that is enclosed by a ring of radius 1.0, adjacent to finger 315F on the display of touchscreen display 110, visually indicating to the user that the current pressure of finger 315F exhibits a current pressure level of 0.6.

FIG. 3G shows a further changed visual indicator that the disclosed variable pressure touch system may render when the user touches the display with a higher pressure level than in FIG. 3F. For example, with respect to the IHS in FIG. 1A, in FIG. 3G a user may touch the touch sensor in touchscreen display 110 with finger 315G. The touch sensor of touchscreen display 110 may generate a current pressure indication of the current pressure exhibited by the touch of finger 315G on the touch sensor of touchscreen display 110. In this example, the touch sensor of touchscreen display 110 may generate a current pressure indication with a normalized current pressure value of 0.7. In other words, the touch sensor of touchscreen display 110 is at 70% utilization. Touch tool 800 may receive the current pressure indication from the touch sensor of the touchscreen display 110.

Touch tool 800 may generate a visual indicator 320G in response to the current pressure indication. Touch tool 800 generates a visual indicator 320G that includes a solid circle of radius 0.7 that is enclosed by a ring of radius 1.0, adjacent to finger 315G, indicating a current pressure level of 0.7. Touch tool 800 may display visual indicator 320G that includes a solid circle of radius 0.7 that is enclosed by a ring of radius 1.0, adjacent to finger 315G on the display of touchscreen display 110, visually indicating to the user that the current pressure of finger 315G exhibits a current pressure level of 0.7.

FIG. 3H shows a still further changed visual indicator that the disclosed variable pressure touch system may render on the display when the user touches the display with an even higher pressure level than in FIG. 3G. For example, with respect to the IHS in FIG. 1A, in FIG. 3H a user may touch the touch sensor in touchscreen display 110 with finger 315H. The touch sensor of touchscreen display 110 may generate a current pressure indication of the current pressure exhibited by the touch of finger 315H on the touch sensor of touchscreen display 110. In this example, the touch sensor of touchscreen display 110 may generate a current pressure indication with a normalized current pressure value of 0.8. In other words, the touch sensor of touchscreen display 110 is at 80% utilization. Touch tool 800 may receive the current pressure indication from the touch sensor of the touchscreen display 110.

Touch tool 800 may generate a visual indicator 320H in response to the current pressure indication. Touch tool 800 generates a visual indicator 320H that includes a solid circle of radius 0.8 that is enclosed by a ring of radius 1.0, adjacent to finger 315H, indicating a current pressure level of 0.8. Touch tool 800 may display visual indicator 320H that includes a solid circle of radius 0.8 that is enclosed by a ring of radius 1.0, adjacent to finger 315H on the display of touchscreen display 110, visually indicating to the user that the current pressure of finger 315H exhibits a current pressure level of 0.8.

FIG. 3I shows a further changed visual indicator that the disclosed variable pressure touch system may render on the display when the user touches the display with an even higher pressure level than in FIG. 3H. For example, with respect to the IHS in FIG. 1A, in FIG. 3I a user may touch the touch sensor in touchscreen display 110 with finger 315I. The touch sensor of touchscreen display 110 may generate a current pressure indication of the current pressure exhibited by the touch of finger 315I on the touch sensor of touchscreen display 110. In this example, the touch sensor of touchscreen display 110 may generate a current pressure indication with a normalized current pressure value of 0.9. In other words, the touch sensor of touchscreen display 110 is at 90% utilization. Touch tool 800 may receive the current pressure indication from the touch sensor of the touchscreen display 110.

Touch tool 800 may generate a visual indicator 320I in response to the current pressure indication. Touch tool 800 generates a visual indicator 320I that includes a solid circle of radius 0.9 that is enclosed by a ring of radius 1.0, adjacent to finger 315I, indicating a current pressure level of 0.9. Touch tool 800 may display visual indicator 320I that includes a solid circle of radius 0.9 that is enclosed by a ring of radius 1.0, adjacent to finger 315I on the display of touchscreen display 110, visually indicating to the user that the current pressure of finger 315I exhibits a current pressure level of 0.9.

FIG. 3J shows a still further changed visual indicator that the disclosed variable pressure touch system may render on the display when the user touches the display with an even higher pressure level than in FIG. 3I. For example, with respect to the IHS in FIG. 1A, in FIG. 3J a user may touch the touch sensor in touchscreen display 110 with finger 315J. The touch sensor of touchscreen display 110 may generate a current pressure indication of the current pressure exhibited by the touch of finger 315J on the touch sensor of touchscreen display 110. In this example, the touch sensor of touchscreen display 110 may generate a current pressure indication with a normalized current pressure value of 1.0. In other words, the touch sensor of touchscreen display 110 is at 100% utilization. Touch tool 800 may receive the current pressure indication from the touch sensor of the touchscreen display 110.

Touch tool 800 may generate a visual indicator 320J in response to the current pressure indication. Touch tool 800 generates a visual indicator 320J that includes a solid circle of radius 1.0 that is enclosed by a ring of radius 1.0, adjacent to finger 315J, indicating a current pressure level of 1.0. Touch tool 800 may display visual indicator 320J that includes a solid circle of radius 1.0 that is enclosed by a ring of radius 1.0, adjacent to finger 315J on the display of touchscreen display 110, visually indicating to the user that the current pressure of finger 315J exhibits a current pressure level of 1.0.

Figure 4B:
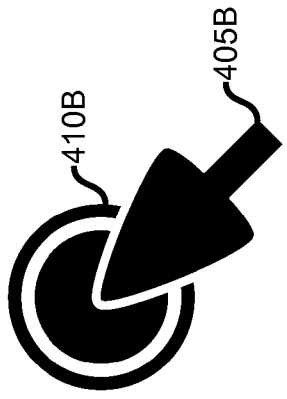
FIGS. 4A-4D are illustrative examples of an embodiment of a cursor touch visual indicator that the disclosed system may employ, wherein different touch pressures result in different displayed detail levels
Figure 4D:
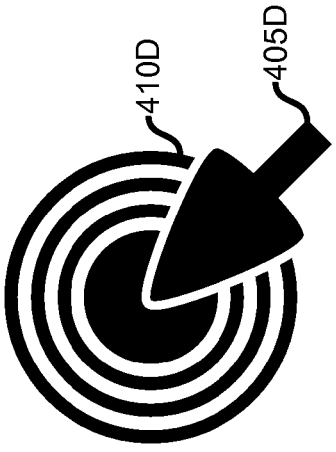
Figure 4A:
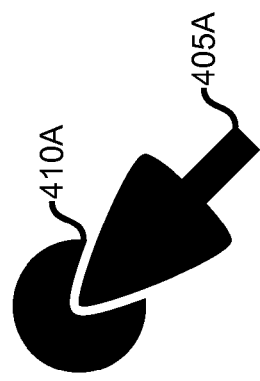

FIGS. 4A-4D are illustrative examples of one embodiment of a cursor touch visual indicator that displays a detail level related to touch pressure on a touch sensor such as a trackpad for example. FIG. 4A is an illustrative example of one embodiment of a visual indicator in the disclosed variable pressure touch system. For example, with respect to the IHS in FIG. 1C, in FIG. 4A a user may touch the touch sensor of trackpad 155 with finger 160. The position of cursor 405A on display 150 may correspond with the changes in position of finger 160 on trackpad 155. The touch sensor of trackpad 155 may generate a current pressure indication of the current pressure exhibited by the touch of finger 160 on the touch sensor of trackpad 155. In this example, the touch sensor of trackpad 155 may generate a current pressure indication with a normalized current pressure value of 0.05. Touch tool 800 may receive the current pressure indication from the touch sensor of the trackpad 155.

Touch tool 800 may utilize the current pressure indication of 0.05 to determine a particular detail level of 0 from the plurality of detail levels for the touch of finger 160 on the touch sensor of trackpad 155. Touch tool 800 may generate a visual indicator 410A in response to the particular detail level. Touch tool 800 generates a visual indicator 410A that includes a solid circle that is not enclosed by any rings, adjacent to cursor 405A, indicating a detail level of 0. Touch tool 800 may display visual indicator 410A that includes a solid circle adjacent to cursor 405A on display 150, visually indicating to the user that the current pressure of finger 160 exhibits a detail level of 0.

FIG. 4B shows a changed visual indicator that the disclosed variable pressure touch system may render on the display when the user touches the trackpad with a higher pressure level than that used with respect to FIG. 4A. For example, with respect to the IHS in FIG. 1C, in FIG. 4B a user may touch the touch sensor of trackpad 155 with finger 160. The position of cursor 405A on display 150 may correspond with the changes in position of finger 160 on trackpad 155. The touch sensor of trackpad 155 may generate a current pressure indication of the current pressure exhibited by the touch of finger 160 on the touch sensor of trackpad 155. In this example, the touch sensor of trackpad 155 may generate a current pressure indication with a normalized current pressure value of 0.2. Touch tool 800 may receive the current pressure indication from the touch sensor of the trackpad 155.

Touch tool 800 may utilize the current pressure indication of 0.2 to determine a particular detail level of 1 from the plurality of detail levels for the touch of finger 160 on the touch sensor of trackpad 155. Touch tool 800 may generate a visual indicator 410B in response to the particular detail level. Touch tool 800 generates a visual indicator 410B that includes a solid circle that is enclosed by one ring, adjacent to cursor 405B, indicating a detail level of 1. Touch tool 800 may display visual indicator 410B that includes a solid circle that is enclosed by one ring, adjacent to cursor 405B on display 150, visually indicating to the user that the current pressure of finger 160 exhibits a detail level of 1.

Figure 4C:
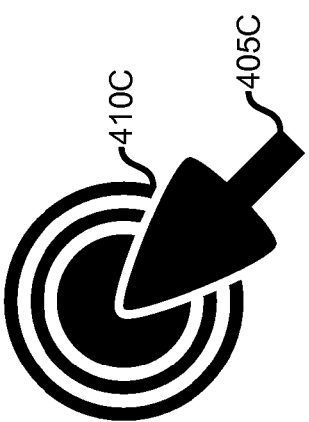

FIG. 4C shows a changed visual indicator that the disclosed variable pressure touch system may render on the display when the user touches the display with a still higher pressure level than that used with reference to the example of FIG. 4B. For example, with respect to the IHS in FIG. 1C, in FIG. 4C a user may touch the touch sensor of trackpad 155 with finger 160. The position of cursor 405C on display 150 may correspond with the changes in position of finger 160 on trackpad 155. The touch sensor of trackpad 155 may generate a current pressure indication of the current pressure exhibited by the touch of finger 160 on the touch sensor of trackpad 155. In this example, the touch sensor of trackpad 155 may generate a current pressure indication with a normalized current pressure value of 0.5. Touch tool 800 may receive the current pressure indication from the touch sensor of the trackpad 155.

Touch tool 800 may utilize the current pressure indication of 0.5 to determine a particular detail level of 2 from the plurality of detail levels for the touch of finger 160 on the touch sensor of trackpad 155. Touch tool 800 may generate a visual indicator 410C in response to the particular detail level. Touch tool 800 generates a visual indicator 410C that includes a solid circle that is enclosed by two rings, adjacent to cursor 405C, indicating a detail level of 2. Touch tool 800 may display visual indicator 410C that includes a solid circle that is enclosed by two rings, adjacent to cursor 405C on display 150, visually indicating to the user that the current pressure of finger 160 exhibits a detail level of 2.

FIG. 4D shows a changed visual indicator that the disclosed variable pressure touch system may render on the display when the user touches the display with an even higher pressure level than that used with reference to the example of FIG. 4C. For example, with respect to the IHS in FIG. 1C, in FIG. 4D a user may touch the touch sensor of trackpad 155 with finger 160. The position of cursor 405D on display 150 may correspond with the changes in position of finger 160 on trackpad 155. The touch sensor of trackpad 155 may generate a current pressure indication of the current pressure exhibited by the touch of finger 160 on the touch sensor of trackpad 155. In this example, the touch sensor of trackpad 155 may generate a current pressure indication with a normalized current pressure value of 0.75. Touch tool 800 may receive the current pressure indication from the touch sensor of the trackpad 155.

Touch tool 800 may utilize the current pressure indication of 0.75 to determine a particular detail level of 3 from the plurality of detail levels for the touch of finger 160 on the touch sensor of trackpad 155. Touch tool 800 may generate a visual indicator 410D in response to the particular detail level. Touch tool 800 generates a visual indicator 410D that includes a solid circle that is enclosed by three rings, adjacent to cursor 405D, indicating a detail level of 3. Touch tool 800 may display visual indicator 410D that includes a solid circle that is enclosed by three rings, adjacent to cursor 405D on display 150, visually indicating to the user that the current pressure of finger 160 exhibits a detail level of 3.

FIGS. 4E-4J are illustrative examples of another embodiment of a cursor touch visual indicator that changes appearance corresponding to the current pressure indication.

Figure 4G:
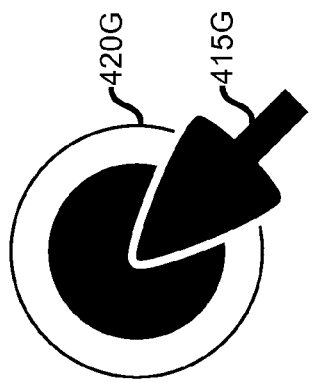
FIGS. 4E-4J are illustrative examples of another embodiment of a cursor touch visual indicator that changes in accordance with the current pressure indication.
Figure 4J:
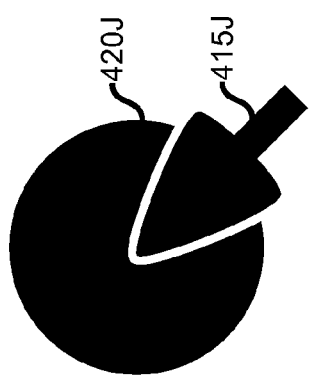
Figure 4F:
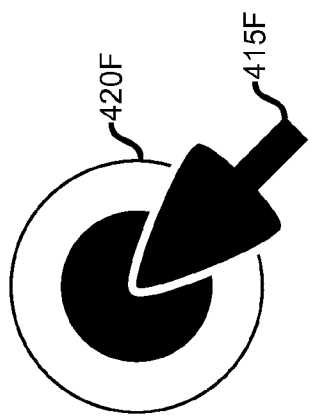
Figure 4I:
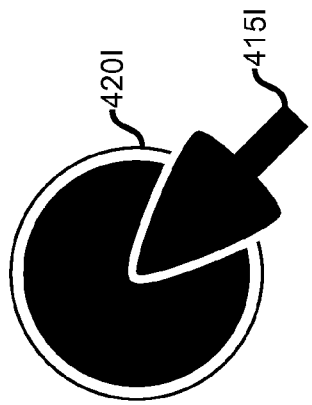
Figure 4E:
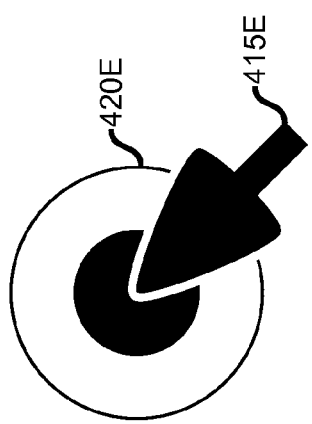

FIG. 4E is an illustrative example of one embodiment of a visual indicator in the disclosed variable pressure touch system. For example, with respect to the IHS in FIG. 1C, in FIG. 4E a user may touch the touch sensor of trackpad 155 with finger 160. The position of cursor 415E on display 150 may correspond with the changes in position of finger 160 on trackpad 155. The touch sensor of trackpad 155 may generate a current pressure indication of the current pressure exhibited by the touch of finger 160 on the touch sensor of trackpad 155. In this example, the touch sensor of trackpad 155 may generate a current pressure indication with a normalized current pressure value of 0.5. In other words, the touch sensor of display 150 is at 50% utilization. Touch tool 800 may receive the current pressure indication from the touch sensor of the trackpad 155.

Touch tool 800 may generate a visual indicator 420E in response to the current pressure indication. Touch tool 800 generates a visual indicator 420E that includes a solid circle of radius 0.5 that is enclosed by a ring of radius 1.0, adjacent to cursor 415E, indicating a current pressure level of 0.5. Touch tool 800 may display visual indicator 420E that includes a solid circle of radius 0.5 that is enclosed by a ring of radius 1.0, adjacent to cursor 415E on display 150, visually indicating to the user that the current pressure of finger 160 exhibits a current pressure level of 0.5.

FIG. 4F shows a changed visual indicator that the disclosed variable pressure touch system may render on the display when the user touches the trackpad using a higher pressure level than in FIG. 4E. For example, with respect to the IHS in FIG. 1C, in FIG. 4F a user may touch the touch sensor of trackpad 155 with finger 160. The position of cursor 415F on display 150 may correspond with the changes in position of finger 160 on trackpad 155. The touch sensor of trackpad 155 may generate a current pressure indication of the current pressure exhibited by the touch of finger 160 on the touch sensor of trackpad 155. In this example, the touch sensor of trackpad 155 may generate a current pressure indication with a normalized current pressure value of 0.6. In other words, the touch sensor of display 150 is at 60% utilization. Touch tool 800 may receive the current pressure indication from the touch sensor of the trackpad 155.

Touch tool 800 may generate a visual indicator 420F in response to the current pressure indication. Touch tool 800 generates a visual indicator 420F that includes a solid circle of radius 0.6 that is enclosed by a ring of radius 1.0, adjacent to cursor 415F, indicating a current pressure level of 0.6. Touch tool 800 may display visual indicator 420F that includes a solid circle of radius 0.6 that is enclosed by a ring of radius 1.0, adjacent to cursor 415F on display 150, visually indicating to the user that the current pressure of finger 160 exhibits a current pressure level of 0.6.

FIG. 4G shows a changed visual indicator that the disclosed variable pressure touch system may render on the display when the user touches the trackpad with an even higher pressure level than in FIG. 4F. For example, with respect to the IHS in FIG. 1C, in FIG. 4G a user may touch the touch sensor of trackpad 155 with finger 160. The position of cursor 415G on display 150 may correspond with the changes in position of finger 160 on trackpad 155. The touch sensor of trackpad 155 may generate a current pressure indication of the current pressure exhibited by the touch of finger 160 on the touch sensor of trackpad 155. In this example, the touch sensor of trackpad 155 may generate a current pressure indication with a normalized current pressure value of 0.7. In other words, the touch sensor of display 150 is at 70% utilization. Touch tool 800 may receive the current pressure indication from the touch sensor of the trackpad 155.

Touch tool 800 may generate a visual indicator 420G in response to the current pressure indication. Touch tool 800 generates a visual indicator 420G that includes a solid circle of radius 0.7 that is enclosed by a ring of radius 1.0, adjacent to cursor 415G, indicating a current pressure level of 0.7. Touch tool 800 may display visual indicator 420G that includes a solid circle of radius 0.7 that is enclosed by a ring of radius 1.0, adjacent to cursor 415G on display 150, visually indicating to the user that the current pressure of finger 160 exhibits a current pressure level of 0.7.

Figure 4H:
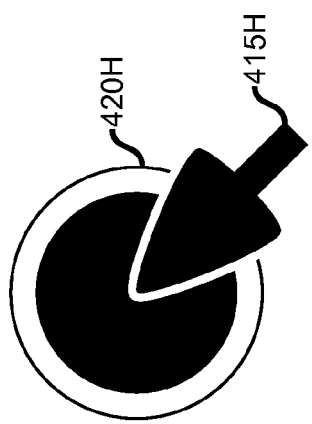

FIG. 4H shows a changed visual indicator that the disclosed variable pressure touch system may render on the display when the user touches the trackpad with a still higher pressure level than in FIG. 4G. For example, with respect to the IHS in FIG. 1C, in FIG. 4H a user may touch the touch sensor of trackpad 155 with finger 160. The position of cursor 415H on display 150 may correspond with the changes in position of finger 160 on trackpad 155. The touch sensor of trackpad 155 may generate a current pressure indication of the current pressure exhibited by the touch of finger 160 on the touch sensor of trackpad 155. In this example, the touch sensor of trackpad 155 may generate a current pressure indication with a normalized current pressure value of 0.8. In other words, the touch sensor of display 150 is at 80% utilization. Touch tool 800 may receive the current pressure indication from the touch sensor of the trackpad 155.

Touch tool 800 may generate a visual indicator 420H in response to the current pressure indication. Touch tool 800 generates a visual indicator 420H that includes a solid circle of radius 0.8 that is enclosed by a ring of radius 1.0, adjacent to cursor 415H, indicating a current pressure level of 0.8. Touch tool 800 may display visual indicator 420H that includes a solid circle of radius 0.8 that is enclosed by a ring of radius 1.0, adjacent to cursor 415H on display 150, visually indicating to the user that the current pressure of finger 160 exhibits a current pressure level of 0.8.

FIG. 4I shows a changed visual indicator that the disclosed variable pressure touch system may render on the display when the user touches the trackpad with an even higher pressure level than in FIG. 4H. For example, with respect to the IHS in FIG. 1C, in FIG. 4I a user may touch the touch sensor of trackpad 155 with finger 160. The position of cursor 415I on display 150 may correspond with the changes in position of finger 160 on trackpad 155. The touch sensor of trackpad 155 may generate a current pressure indication of the current pressure exhibited by the touch of finger 160 on the touch sensor of trackpad 155. In this example, the touch sensor of trackpad 155 may generate a current pressure indication with a normalized current pressure value of 0.9. In other words, the touch sensor of display 150 is at 90% utilization. Touch tool 800 may receive the current pressure indication from the touch sensor of the trackpad 155.

Touch tool 800 may generate a visual indicator 420I in response to the current pressure indication. Touch tool 800 generates a visual indicator 420I that includes a solid circle of radius 0.9 that is enclosed by a ring of radius 1.0, adjacent to cursor 415I, indicating a current pressure level of 0.9. Touch tool 800 may display visual indicator 420I that includes a solid circle of radius 0.9 that is enclosed by a ring of radius 1.0, adjacent to cursor 415I on display 150, visually indicating to the user that the current pressure of finger 160 exhibits a current pressure level of 0.9.

FIG. 4J shows a changed visual indicator that the disclosed variable pressure touch system may render on the display when the user touches the trackpad with a yet even higher pressure level than in FIG. 4I. For example, with respect to the IHS in FIG. 1C, in FIG. 4J a user may touch the touch sensor of trackpad 155 with finger 160. The position of cursor 415J on display 150 may correspond with the changes in position of finger 160 on trackpad 155. The touch sensor of trackpad 155 may generate a current pressure indication of the current pressure exhibited by the touch of finger 160 on the touch sensor of trackpad 155. In this example, the touch sensor of trackpad 155 may generate a current pressure indication with a normalized current pressure value of 1.0. In other words, the touch sensor of display 150 is at 100% utilization. Touch tool 800 may receive the current pressure indication from the touch sensor of the trackpad 155.

Touch tool 800 may generate a visual indicator 420J in response to the current pressure indication. Touch tool 800 generates a visual indicator 420J that includes a solid circle of radius 1.0 that is enclosed by a ring of radius 1.0, adjacent to cursor 415J, indicating a current pressure level of 1.0. Touch tool 800 may display visual indicator 420J that includes a solid circle of radius 1.0 that is enclosed by a ring of radius 1.0, adjacent to cursor 415J on display 150, visually indicating to the user that the current pressure of finger 160 exhibits a current pressure level of 1.0. In an alternative embodiment, instead of the size and/or the geometry of the visual indicator changing as the current pressure level changes, the visual indicator may vary from color to color as the current pressure level changes. For example, the visual indicator color may change in spectrum sequence order, namely red, orange, yellow, green, blue and violet (or reverse order) as the current pressure changes from 0.5, 0.6, 0.7, 0.8, 0.9 to 1.0, respectively. In this manner, a different color corresponds to each pressure level. In another alternative embodiment, the opacity of the visual indicator may change as the current pressure level changes. In yet another alternative embodiment, the visual indicator may employ growing bars, such as vertical and/or horizontal bars that change in dimension as the current pressure level changes. For example, the dimensions of the bar may increase as the current pressure level changes. Alternatively, more vertical and/or horizontal bars with increasing and/or decreasing dimensions may be added to the visual indicator as the current pressure changes.

FIGS. 5A-5D together illustrate an embodiment of the disclosed variable pressure touch system where the detail level corresponding to a particular touch pressure may be inclusive of detail levels associated with other touch pressures. FIGS. 5A-5D show the inclusive display of detail levels in one embodiment of an IHS in the disclosed variable pressure touch system that may employ a tablet 500 with a touchscreen display 505. Like numbers indicate like elements when comparing FIGS. 5A-5D. Touchscreen display 505 may include a touch sensor and a display. In one embodiment, a user may press upon touchscreen display 505 with a finger 510. In other words, the user may touch the touch sensor in touchscreen display 505 with finger 510. In other embodiments, finger 510 may be a stylus or other implement with which force may be applied to touchscreen display 505. In this example, a laptop, i.e. commercial product 520, is shown on the display of touchscreen display 505.

Figure 5A:
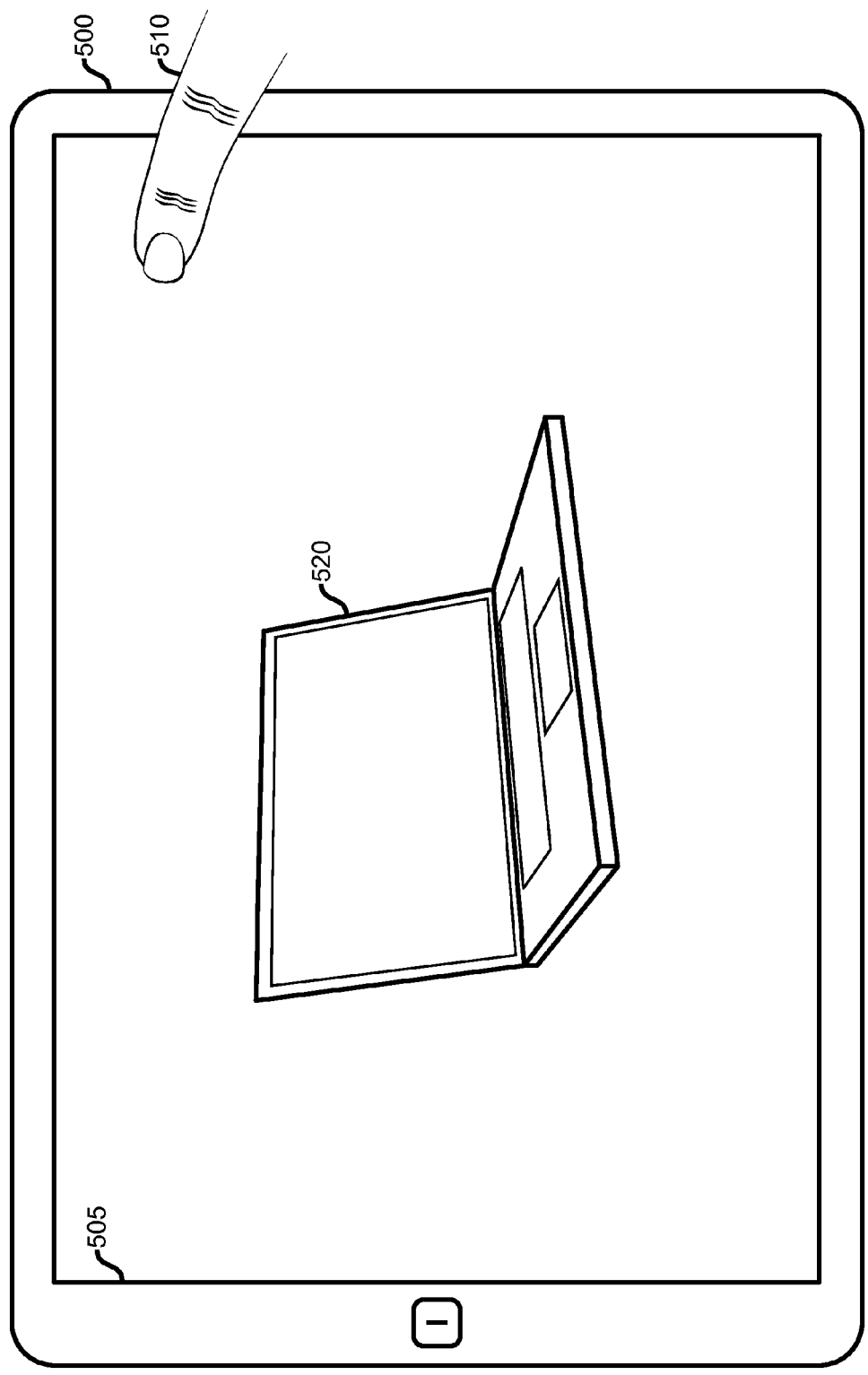
FIGS. 5A-5D are block diagrams of one embodiment of the disclosed variable pressure touch system where the detail level is inclusive of other detail levels.

In this example, there is no visual indicator in FIG. 5A as finger 510 is not touching the touch sensor of touchscreen display 505. Without a touch by finger 510 on the touch sensor of touchscreen display 505, the touch sensor of touchscreen display 505 may generate a current pressure indication of the current pressure exhibited on the touch sensor of touchscreen display 505, wherein the current pressure indication is a normalized current pressure value of 0, because finger 510 is not touching the touch sensor of touchscreen display 505. A touch tool 800 of tablet 500, as discussed in more detail below, may receive the current pressure indication of 0 from the touch sensor of the touchscreen display 505.

Figure 5B:
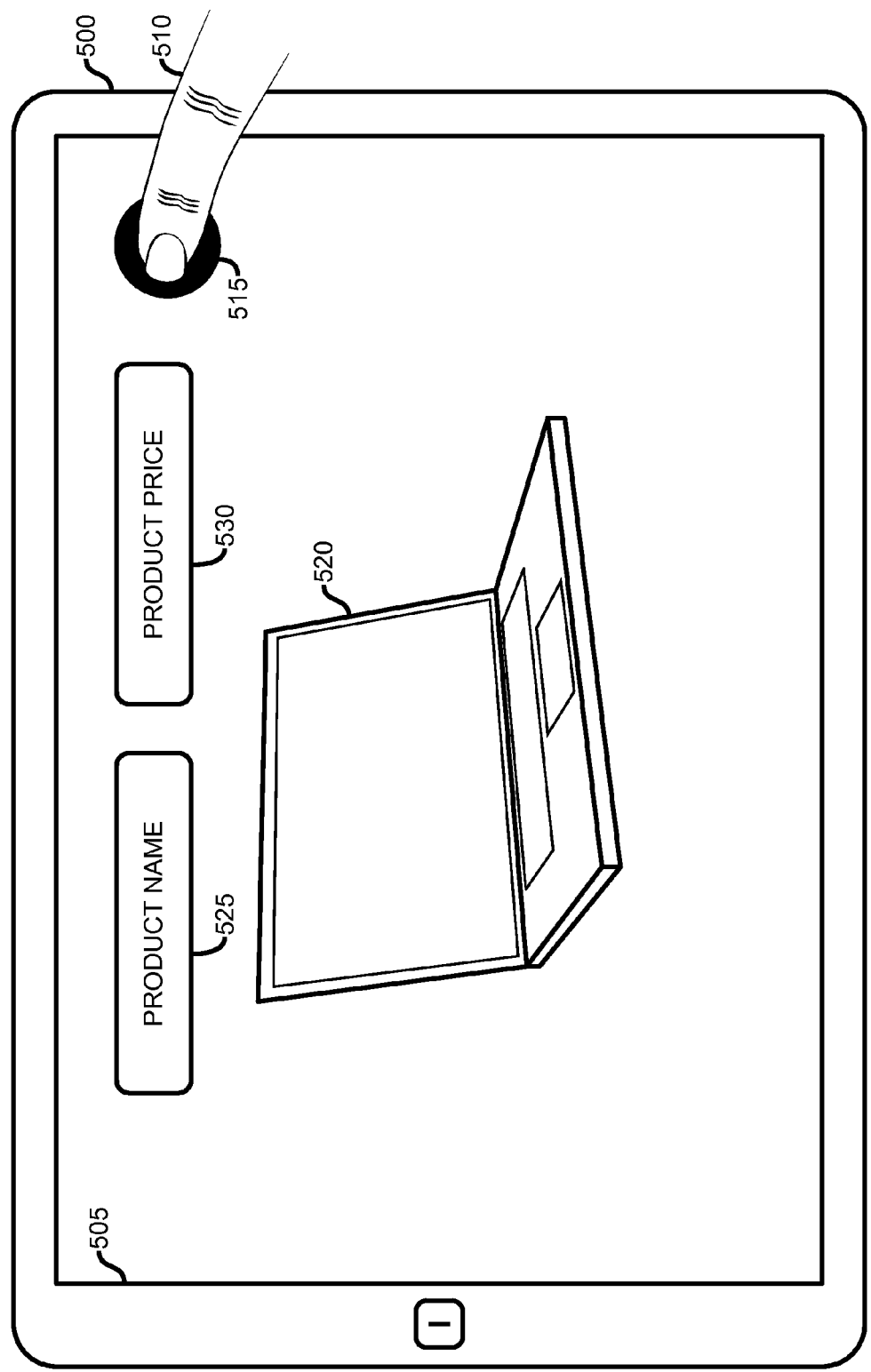

As shown in FIG. 5B, the user may touch the touch sensor of touchscreen display 505 with finger 510, using more pressure than in FIG. 5A. The touch sensor of touchscreen display 505 may generate a current pressure indication of the current pressure exhibited by the touch of finger 510 on the touch sensor of touchscreen display 505. Touch tool 800 may receive the current pressure indication from the touch sensor of the touchscreen display 505. In one embodiment, touch tool 800 may determine that the current pressure indication exhibits a particular detail level of 0 from a plurality of detail levels. Touch tool 800 may generate a visual indicator 515 in response to the particular detail level. In this example, touch tool 800 may generate a visual indicator 515 that includes a solid circle that is not enclosed by any rings, adjacent to finger 510, indicating a detail level of 0. Touch tool 800 may display visual indicator 515 on the display of touchscreen display 505, as shown in FIG. 5B.

Touch tool 800 may generate a display image in response to the particular detail level. In this example, touch tool 800 may generate a display image that includes particular detail level information, wherein the detail level information for a detail level of 0 includes the product name 525 and the product price 530. Touch tool 800 may then display a display image on the display of touchscreen display 505 that includes particular detail level information, wherein the detail level information for a detail level of 0 includes the product name 525 and the product price 530, as shown in FIG. 5B.

Figure 5C:
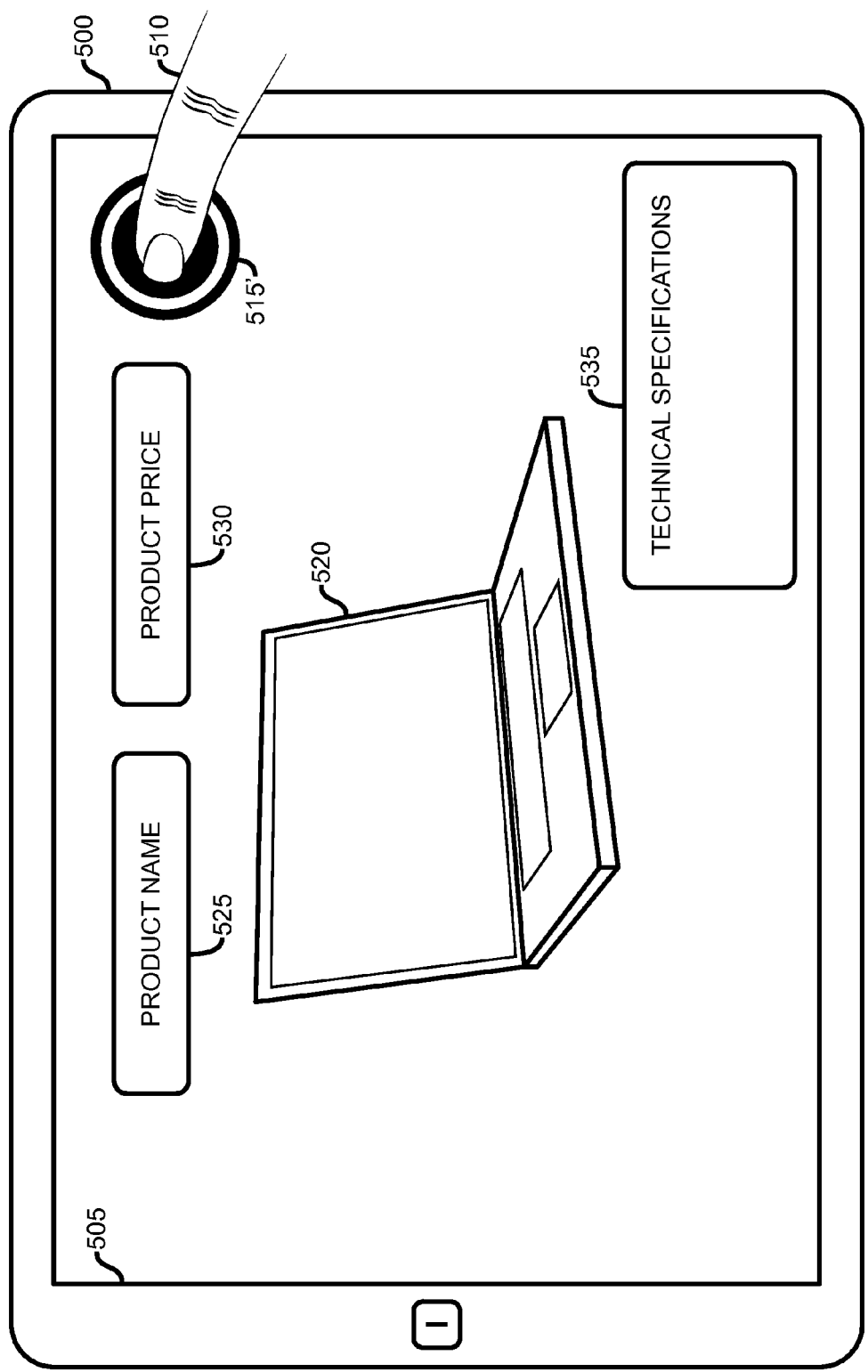

As shown in FIG. 5C, the user may touch the touch sensor of touchscreen display 505 with finger 510, using even more pressure than in FIG. 5B. The touch sensor of touchscreen display 505 may generate a current pressure indication of the current pressure exhibited by the touch of finger 510 on the touch sensor of touchscreen display 505. Touch tool 800 may receive the current pressure indication from the touch sensor of the touchscreen display 505. In one embodiment, touch tool 800 may determine that the current pressure indication exhibits a particular detail level of 1 from a plurality of detail levels. Touch tool 800 may generate a visual indicator 515' in response to the particular detail level. In this example, touch tool 800 may generate a visual indicator 515' that includes a solid circle that is enclosed by one ring, adjacent to finger 510, indicating a detail level of 1. Touch tool 800 may display visual indicator 515' on the display of touchscreen display 505, as shown in FIG. 5C.

Touch tool 800 may generate a display image in response to the particular detail level. In this example, touch tool 800 may generate a display image that includes particular detail level information, wherein the detail level information for a detail level of 1 includes technical specifications 535. Touch tool 800 may also inclusively include in the display image the detail level information of the preceding detail levels, namely detail level information for a detail level of 1 that includes product name 525 and product price 530. Touch tool 800 may then display a display image on the display of touchscreen display 505 that includes particular detail level information, wherein the detail level information for a detail level of 1 includes the technical specifications 535. Touch tool 800 may also inclusively include and display the detail level information of the preceding detail levels, namely detail level information for a detail level of 1 that includes product name 525 and product price 530, as shown in FIG. 5C. In this manner, touch tool 800 inclusively displays both the detail level information of detail level 0 and detail level 1 cumulatively.

Figure 5D:
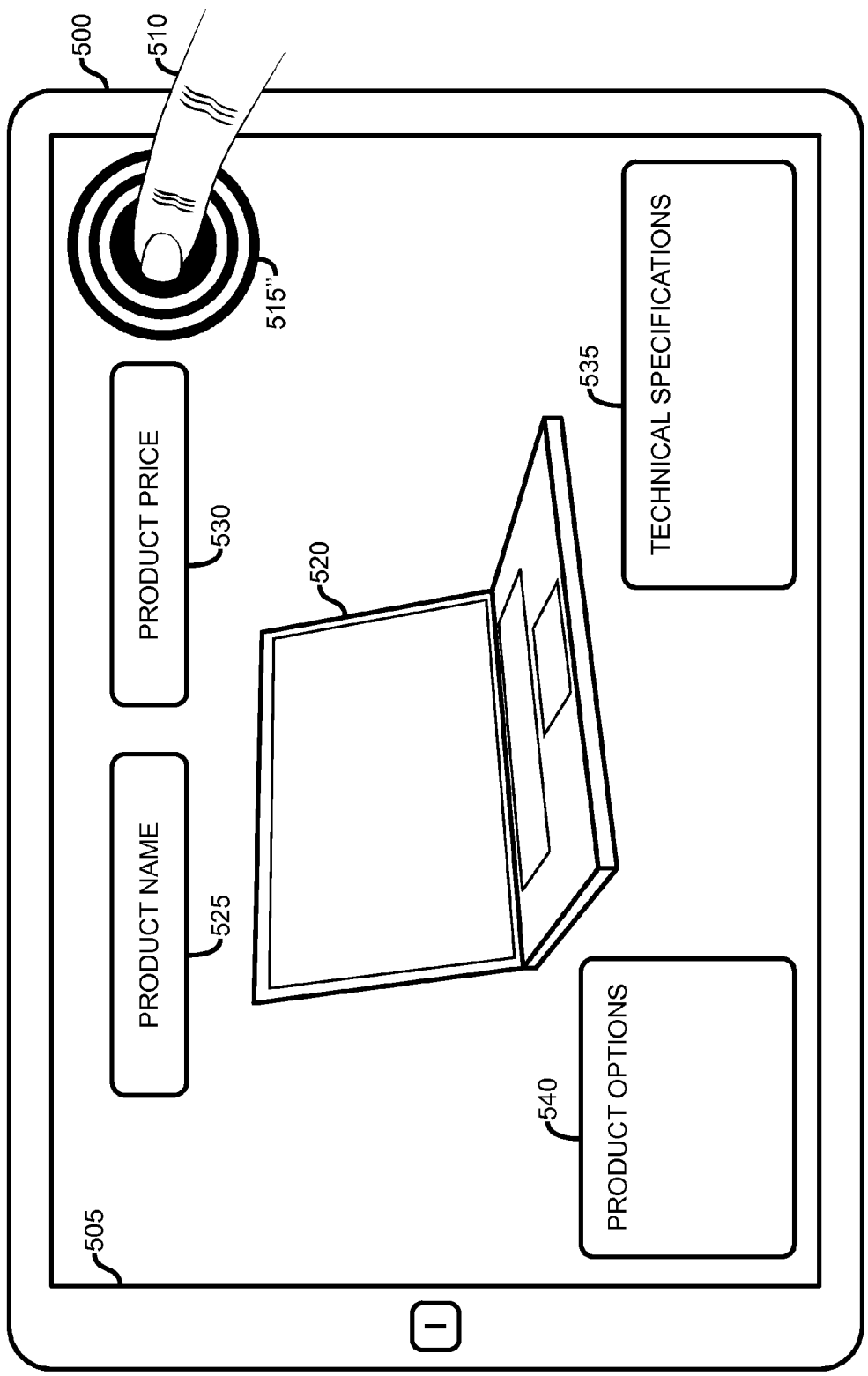

As shown in FIG. 5D, the user may touch the touch sensor of touchscreen display 505 with finger 510, using still even more pressure than in FIG. 5C. The touch sensor of touchscreen display 505 may generate a current pressure indication of the current pressure exhibited by the touch of finger 510 on the touch sensor of touchscreen display 505. Touch tool 800 may receive the current pressure indication from the touch sensor of the touchscreen display 505. In one embodiment, touch tool 800 may determine that the current pressure indication exhibits a particular detail level of 2 from a plurality of detail levels. Touch tool 800 may generate a visual indicator 515" in response to the particular detail level. In this example, touch tool 800 may generate a visual indicator 515" that includes a solid circle that is enclosed by two rings, adjacent to finger 510, indicating a detail level of 2. Touch tool 800 may display visual indicator 515" on the display of touchscreen display 505, as shown in FIG. 5D.

Touch tool 800 may generate a display image in response to the particular detail level. In this example, touch tool 800 may generate a display image that includes particular detail level information, wherein the detail level information for a detail level of 2 includes product options 540. Touch tool 800 may also inclusively include in the display image the detail level information of the preceding detail levels, namely detail level information for a detail level of 1 that includes technical specifications 535 and detail level information for a detail level of 0 that includes product name 525 and product price 530. Touch tool 800 may then display a display image on the display of touchscreen display 505 that includes particular detail level information, wherein the detail level information for a detail level of 2 includes the product options 540. Touch tool 800 may also inclusively include and display the detail level information of the preceding detail levels, namely detail level information for a detail level of 1 that includes technical specifications 535 and detail level information for a detail level of 0 that includes product name 525 and product price 530, as shown in FIG. 5D. In other words, touch tool 800 inclusively displays the detail level information of detail level 0, detail level 1 and detail level 2 cumulatively.

FIGS. 6A-6D together illustrate an embodiment of the disclosed variable pressure touch system where the detail level corresponding to a particular touch pressure is exclusive of other detail levels. FIGS. 6A-6D show the exclusive display of detail levels in one embodiment of an IHS in the disclosed variable pressure touch system that may employ a tablet 600 with a touchscreen display 605. Like numbers indicate like elements when comparing FIGS. 6A-6D. Touchscreen display 605 may include a touch sensor and a display. In one embodiment, a user may press upon touchscreen display 605 with a finger 610. In other words, the user may touch the touch sensor in touchscreen display 605 with finger 610. In other embodiments, finger 610 may be a stylus or other implement with which force may be applied to touchscreen display 605. In this example, a smartphone, i.e., product 620 is shown on the display of touchscreen display 605.

Figure 6A:
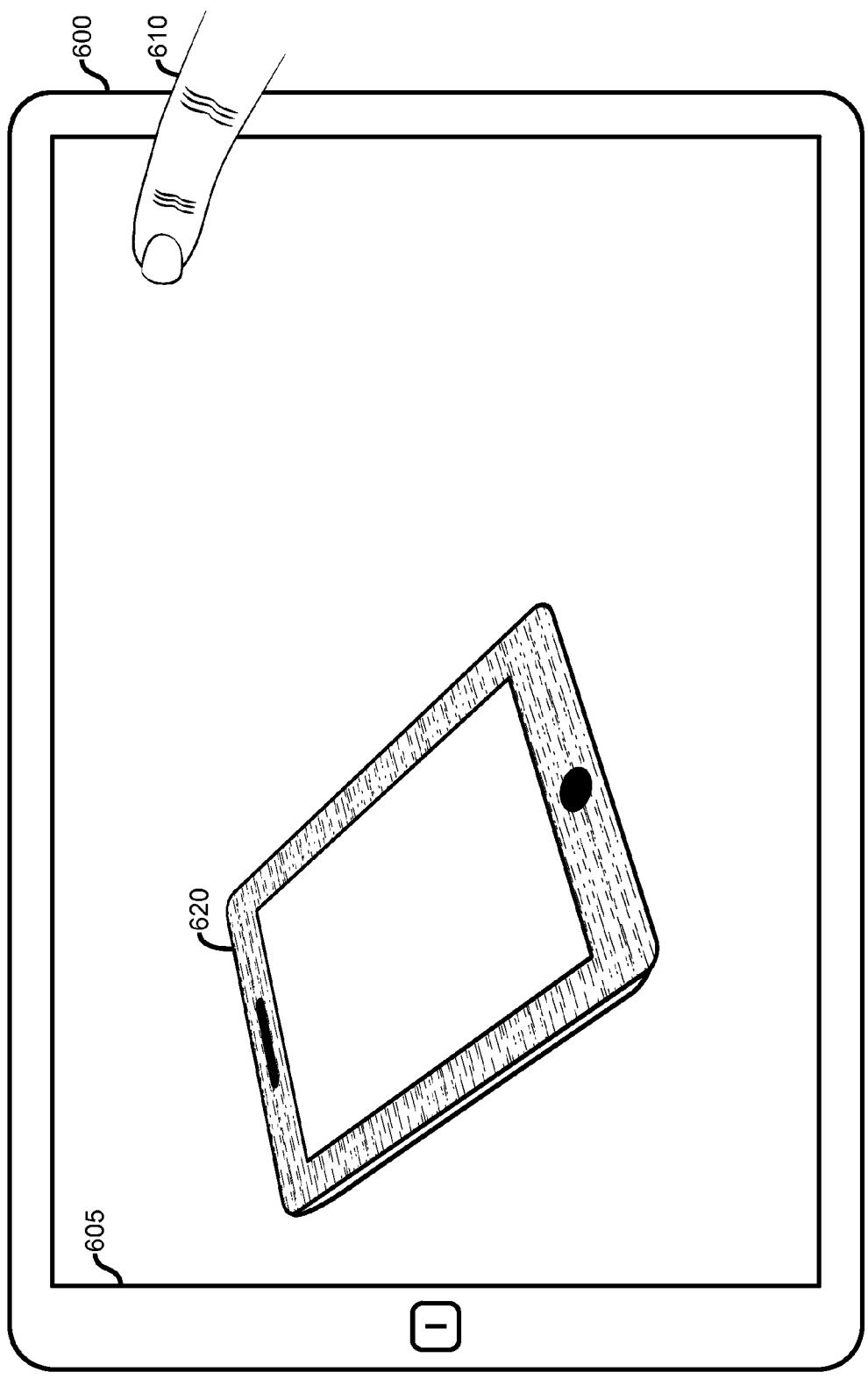

In this example, there is no visual indicator in FIG. 6A because finger 610 is not touching the touch sensor of touchscreen display 605. Without a touch by finger 610 on the touch sensor of touchscreen display 605, the touch sensor of touchscreen display 605 may generate a current pressure indication of the current pressure exhibited on the touch sensor of touchscreen display 605, wherein the current pressure indication is a normalized current pressure value of 0, because finger 610 is not touching the touch sensor of touchscreen display 605. A touch tool 800 of tablet 600, as discussed in more detail below, may receive the current pressure indication of 0 from the touch sensor of the touchscreen display 605.

Figure 6B:
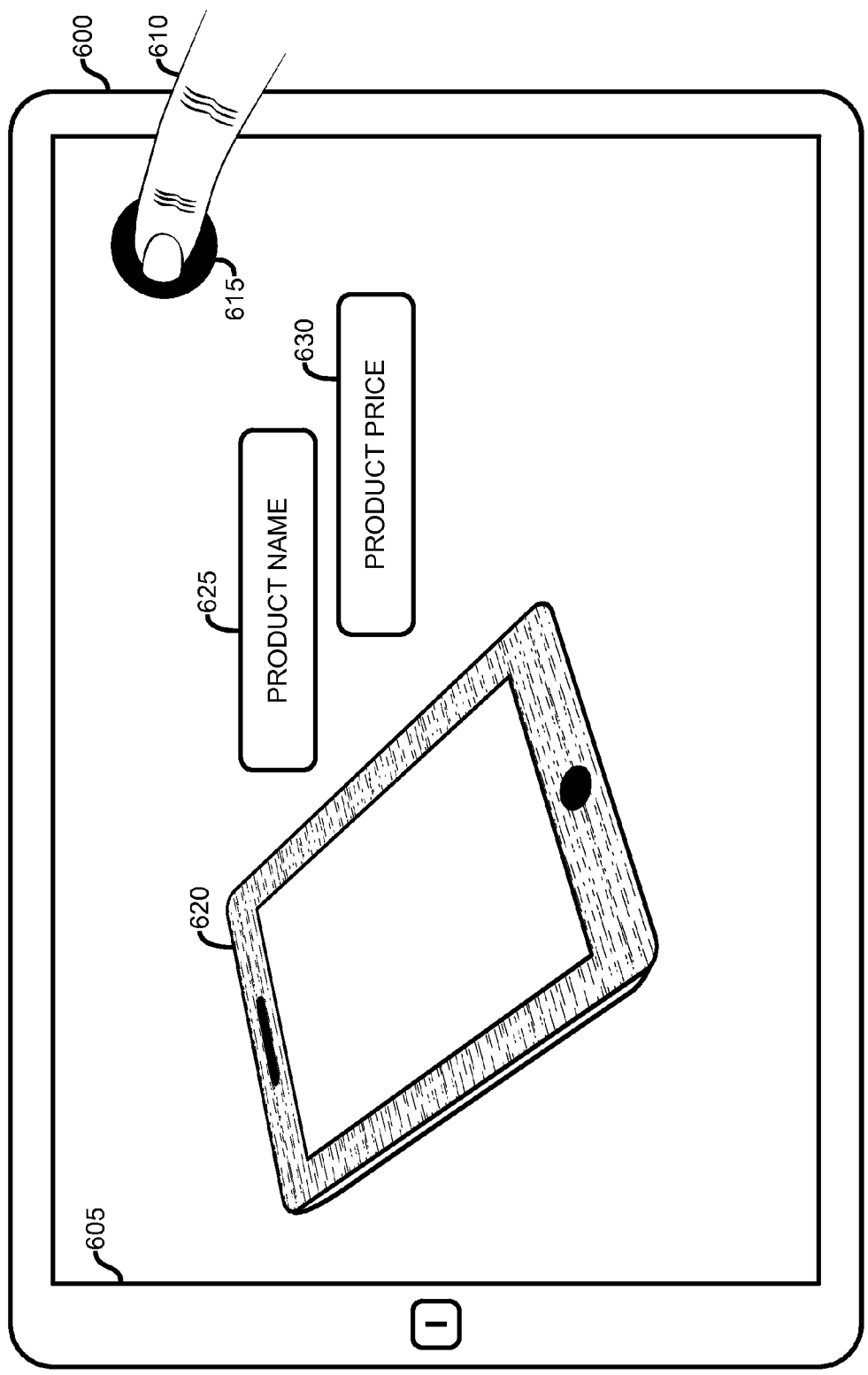

As shown in FIG. 6B, the user may touch the touch sensor of touchscreen display 605 with finger 610, using more pressure than in FIG. 6A. The touch sensor of touchscreen display 605 may generate a current pressure indication of the current pressure exhibited by the touch of finger 610 on the touch sensor of touchscreen display 605. Touch tool 800 may receive the current pressure indication from the touch sensor of the touchscreen display 605. In one embodiment, touch tool 800 may determine that the current pressure indication exhibits a particular detail level of 0 from a plurality of detail levels. Touch tool 800 may generate a visual indicator 615 in response to the particular detail level. In this example, touch tool 800 may generate a visual indicator 615 that includes a solid circle that is not enclosed by any rings, adjacent to finger 610, indicating a detail level of 0. Touch tool 800 may display visual indicator 615 on the display of touchscreen display 605, as shown in FIG. 6B.

Touch tool 800 may generate a display image in response to the particular detail level. In this example, touch tool 800 may generate a display image that includes particular detail level information, wherein the detail level information for a detail level of 0 includes the product name 625 and the product price 630. Touch tool 800 may then display a display image on the display of touchscreen display 605 that includes particular detail level information, wherein the detail level information for a detail level of 0 includes the product name 625 and the product price 630, as shown in FIG. 6B.

Figure 6C:
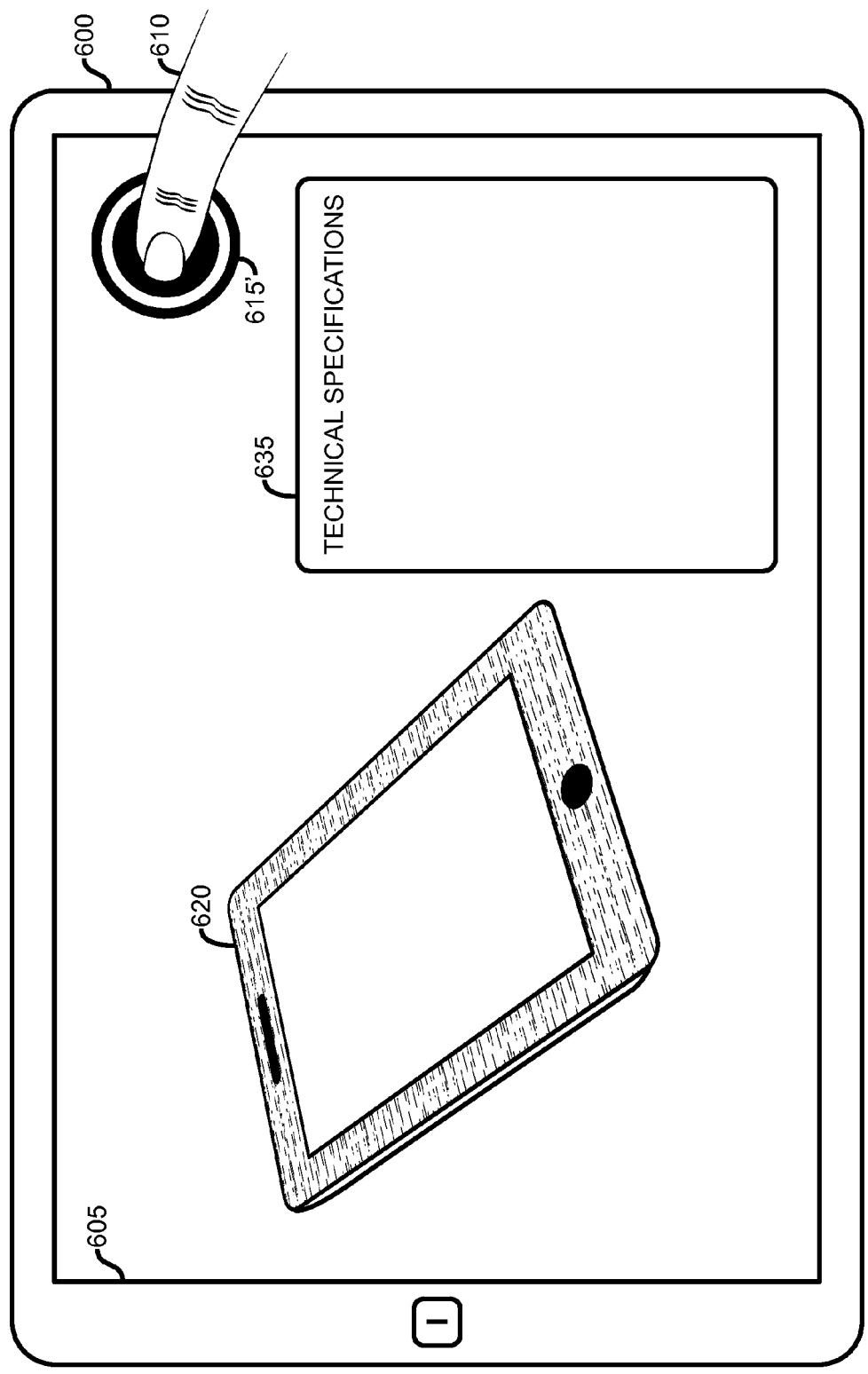

As shown in FIG. 6C, the user may touch the touch sensor of touchscreen display 605 with finger 610, using yet even more pressure than in FIG. 6B. The touch sensor of touchscreen display 605 may generate a current pressure indication of the current pressure exhibited by the touch of finger 610 on the touch sensor of touchscreen display 605. Touch tool 800 may receive the current pressure indication from the touch sensor of the touchscreen display 605. In one embodiment, touch tool 800 may determine that the current pressure indication exhibits a particular detail level of 1 from a plurality of detail levels. Touch tool 800 may generate a visual indicator 615' in response to the particular detail level. In this example, touch tool 800 may generate a visual indicator 615' that includes a solid circle that is enclosed by one ring, adjacent to finger 610, indicating a detail level of 1. Touch tool 800 may display visual indicator 615' on the display of touchscreen display 605, as shown in FIG. 6C.

Touch tool 800 may generate a display image in response to the particular detail level. In this example, touch tool 800 may generate a display image that includes particular detail level information, wherein the detail level information for a detail level of 1 includes technical specifications 635. Touch tool 800 may exclude from the display image the detail level information of the preceding detail levels, namely detail level information for a detail level of 1 that includes product name 625 and product price 630. Touch tool 800 may then display a display image on the display of touchscreen display 605 that includes particular detail level information, wherein the detail level information for a detail level of 1 includes the technical specifications 635, as shown in FIG. 6C. In other words, touch tool 800 excludes detail level information of detail level 1, namely detail level information of a preceding detail level. In this manner, touch tool 800 displays detail information that is exclusive of the preceding detail level.

As shown in FIG. 6D, the user may touch the touch sensor of touchscreen display 605 with finger 610, using still even more pressure than in FIG. 6C. The touch sensor of touchscreen display 605 may generate a current pressure indication of the current pressure exhibited by the touch of finger 610 on the touch sensor of touchscreen display 605. Touch tool 800 may receive the current pressure indication from the touch sensor of the touchscreen display 605. In one embodiment, touch tool 800 may determine that the current pressure indication exhibits a particular detail level of 2 from a plurality of detail levels. Touch tool 800 may generate a visual indicator 615" in response to the particular detail level. In this example, touch tool 800 may generate a visual indicator 615" that includes a solid circle that is enclosed by two rings, adjacent to finger 610, indicating a detail level of 2. Touch tool 800 may display visual indicator 615" on the display of touchscreen display 605, as shown in FIG. 6D.

Touch tool 800 may generate a display image in response to the particular detail level. In this example, touch tool 800 may generate a display image that includes particular detail level information, wherein the detail level information for a detail level of 2 includes product options 640. Touch tool 800 may exclude in the display image the detail level information of the preceding detail levels, namely detail level information for a detail level of 1 that includes technical specifications 635 and detail level information for a detail level of 0 that includes product name 625 and product price 630. Touch tool 800 may then display a display image on the display of touchscreen display 605 that includes particular detail level information, wherein the detail level information for a detail level of 2 includes the product options 640, as shown in FIG. 6D. In other words, touch tool 800 excludes detail level information of detail levels 1 and 0, namely the detail level information of preceding detail levels. In this manner, touch tool 800 displays detail information that is exclusive of the preceding detail levels.

FIGS. 7A-7D together illustrate an embodiment of the disclosed variable pressure touch system where a particular detail level modifies other detail levels associated with other touch pressures. FIGS. 7A-7D show the modified display of detail levels in the IHS of the disclosed variable pressure touch system that may employ a tablet 700 with a touchscreen display 705. Like numbers indicate like elements when comparing FIGS. 7A-7D. Touchscreen display 705 may include a combined touch sensor and display. In one embodiment, a user may press upon touchscreen display 705 with a finger 710. In other words, the user may touch the touch sensor in touchscreen display 705 with finger 710. In other embodiments, finger 710 may be a stylus or other implement with which force may be applied to touchscreen display 705.

Figure 7A:
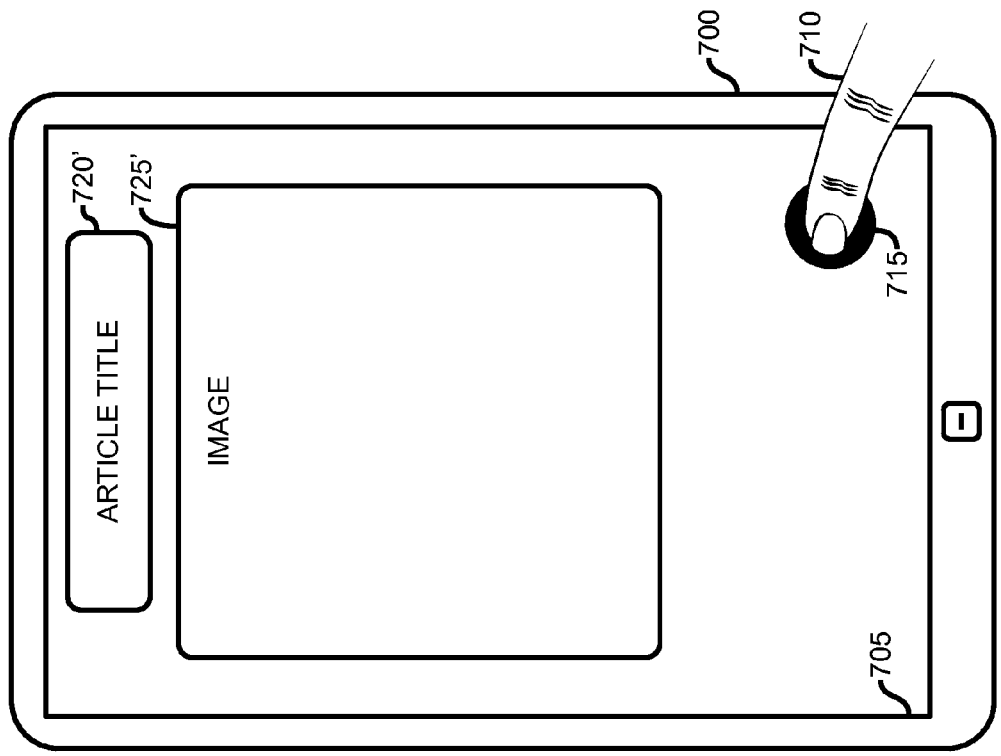
FIGS. 7A-7D are block diagrams of one embodiment of the disclosed variable pressure touch system where a detail level modifies other detail levels.

In this example, there is no visual indicator in FIG. 7A because finger 710 is not touching the touch sensor of touchscreen display 705. Without a touch by finger 710 on the touch sensor of touchscreen display 705, the touch sensor of touchscreen display 705 may generate a current pressure indication of the current pressure exhibited on the touch sensor of touchscreen display 705, wherein the current pressure indication is a normalized current pressure value of 0, because finger 710 is not touching the touch sensor of touchscreen display 705. A touch tool 800 of tablet 700, as discussed in more detail below, may receive the current pressure indication of 0 from the touch sensor of the touchscreen display 705. In this example, an article title 720 and an image 725 are shown inline on the display of touchscreen display 705, as seen in FIG. 7A.

Figure 7B:
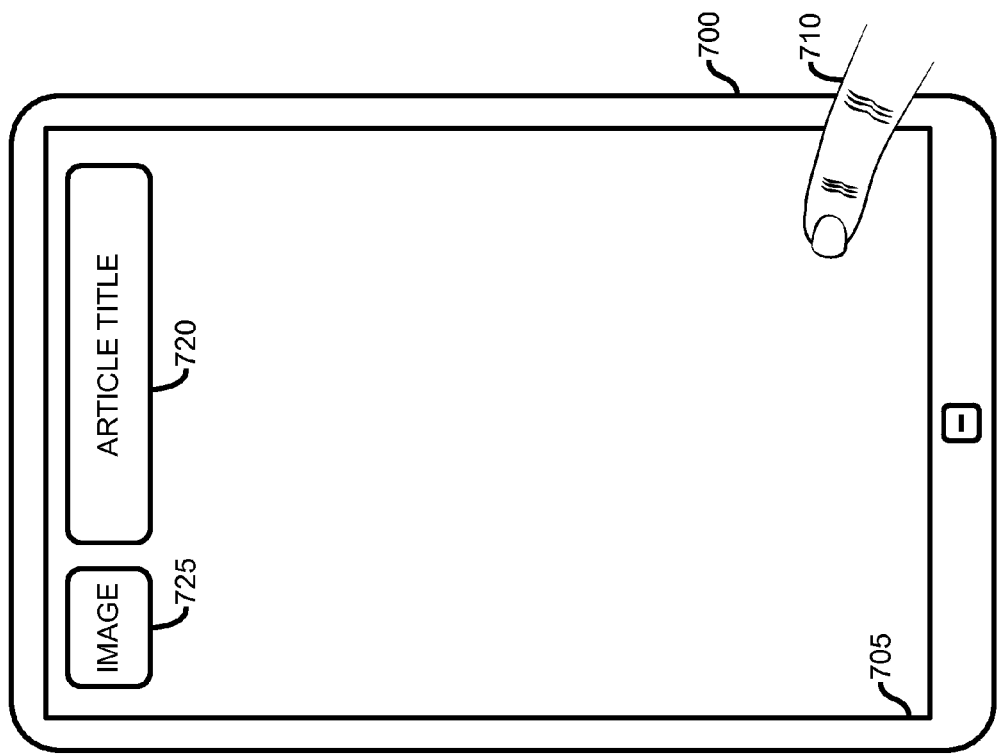

As shown in FIG. 7B, the user may touch the touch sensor of touchscreen display 705 with finger 710, using more pressure than in FIG. 7A. The touch sensor of touchscreen display 705 may generate a current pressure indication of the current pressure exhibited by the touch of finger 710 on the touch sensor of touchscreen display 705. Touch tool 800 may receive the current pressure indication from the touch sensor of the touchscreen display 705. In one embodiment, touch tool 800 may determine that the current pressure indication corresponds to a particular detail level of 0 from a plurality of detail levels. Touch tool 800 may generate a visual indicator 715 in response to the particular detail level. In this example, touch tool 800 may generate a visual indicator 715 that includes a solid circle that is not enclosed by any rings, adjacent to finger 710, indicating a detail level of 0. Touch tool 800 may display visual indicator 715 on the display of touchscreen display 705, as shown in FIG. 7B.

Touch tool 800 may generate a display image in response to the particular detail level determined for the corresponding current pressure indication. In this example, touch tool 800 may generate a display image that modifies the existing display image, that includes particular detail level information, wherein the detail level information for a detail level of 0 includes the article title 720' centered in the display and the image 725' scaled up and centered below the article title 720'. Touch tool 800 may then display a display image on the display of touchscreen display 705 that includes particular detail level information, wherein the detail level information for a detail level of 0 includes the modified article title 720' and image 725', as shown in FIG. 7B.

Figure 7D:
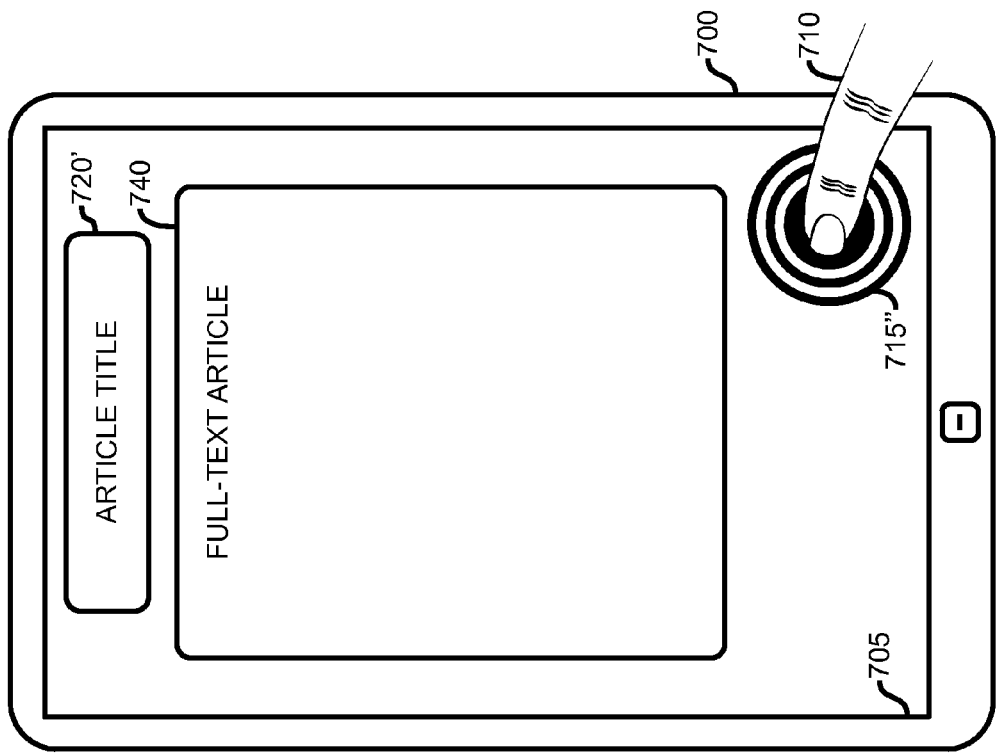
Figure 7C:
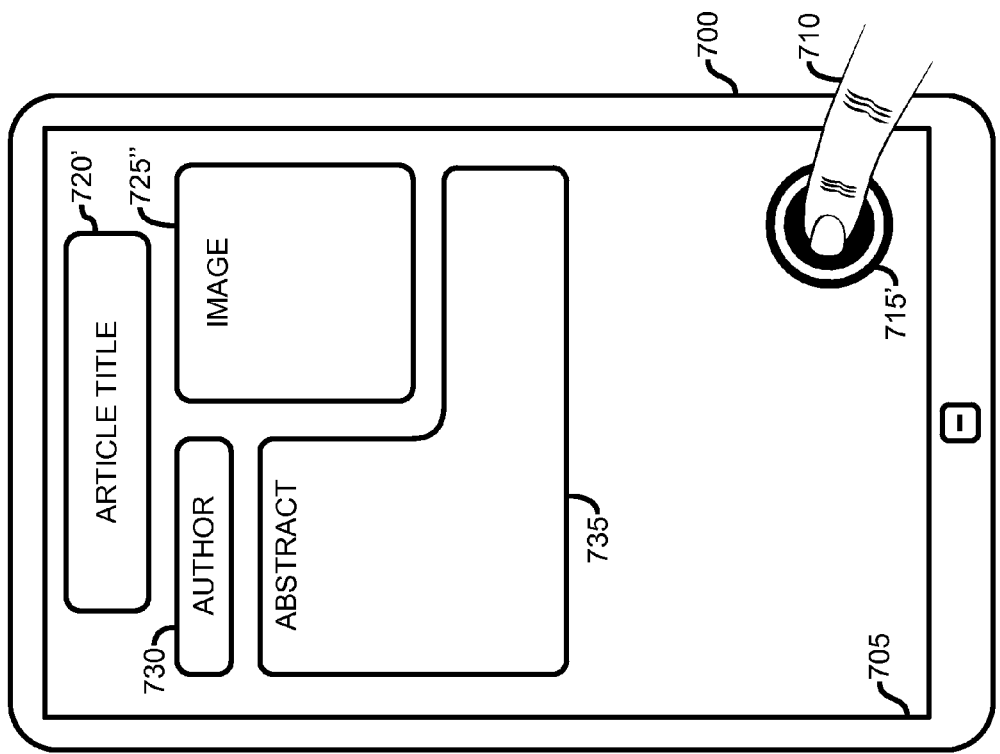

As shown in FIG. 7C, the user may touch the touch sensor of touchscreen display 705 with finger 710, using even more pressure than in FIG. 7B. The touch sensor of touchscreen display 705 may generate a current pressure indication of the current pressure exhibited by the touch of finger 710 on the touch sensor of touchscreen display 705. Touch tool 800 may receive the current pressure indication from the touch sensor of the touchscreen display 705. In one embodiment, touch tool 800 may determine that the current pressure indication corresponds to a particular detail level of 1 from a plurality of detail levels. Touch tool 800 may generate a visual indicator 715' in response to the particular detail level. In this example, touch tool 800 may generate a visual indicator 715' that includes a solid circle that is enclosed by one ring, adjacent to finger 710, indicating a detail level of 1. Touch tool 800 may display visual indicator 715' on the display of touchscreen display 705, as shown in FIG. 7C.

Touch tool 800 may generate a display image in response to the particular detail level determined for the corresponding current pressure indication. In this example, touch tool 800 may generate a display image that includes particular detail level information, wherein the detail level information for a detail level of 1 includes author 730 and abstract 735. Touch tool 800 may also include in the display image the modified detail level information of the preceding detail levels, namely detail level information for a detail level of 1 that includes article title 720' and image 725' as centered article title 720' and a scaled down and repositioned image 725", respectively. Touch tool 800 may then display a display image on the display of touchscreen display 705 that includes particular detail level information, wherein the detail level information for a detail level of 1 includes the author 730 and abstract 735. Touch tool 800 may also include and display the modified detail level information of the preceding detail levels, namely detail level information for a detail level of 1 that includes article title 720' and image 725", as shown in FIG. 7C. In this manner, touch tool 800 modifies and displays both the detail level information of detail level 0 and detail level 1.

As shown in FIG. 7D, the user may touch the touch sensor of touchscreen display 705 with finger 710, using still even more pressure than in FIG. 7C. The touch sensor of touchscreen display 705 may generate a current pressure indication of the current pressure exhibited by the touch of finger 710 on the touch sensor of touchscreen display 705. Touch tool 800 may receive the current pressure indication from the touch sensor of the touchscreen display 705. In one embodiment, touch tool 800 may determine that the current pressure indication exhibits a particular detail level of 2 from a plurality of detail levels. Touch tool 800 may generate a visual indicator 715" in response to the particular detail level. In this example, touch tool 800 may generate a visual indicator 715" that includes a solid circle that is enclosed by two rings, adjacent to finger 710, indicating a detail level of 2. Touch tool 800 may display visual indicator 715" on the display of touchscreen display 705, as shown in FIG. 7D.

Touch tool 800 may generate a display image in response to the particular detail level determined for the corresponding current pressure indication. In this example, touch tool 800 may generate a display image that includes particular detail level information, wherein the detail level information for a detail level of 2 includes full-text article 740. Touch tool 800 may also include in the display image the modified detail level information of the preceding detail levels, namely detail level information for a detail level of 1 and 0 that include article title 720'. Touch tool 800 may then display a display image on the display of touchscreen display 705 that includes particular detail level information, wherein the detail level information for a detail level of 2 includes the full-text article 740. Touch tool 800 may also include and display the modified detail level information of the preceding detail levels, namely the centered article title 720', as shown in FIG. 7D. In other words, touch tool 800 displays the modified detail level information of detail level 0, detail level 1 and detail level 2.

Figure 8:
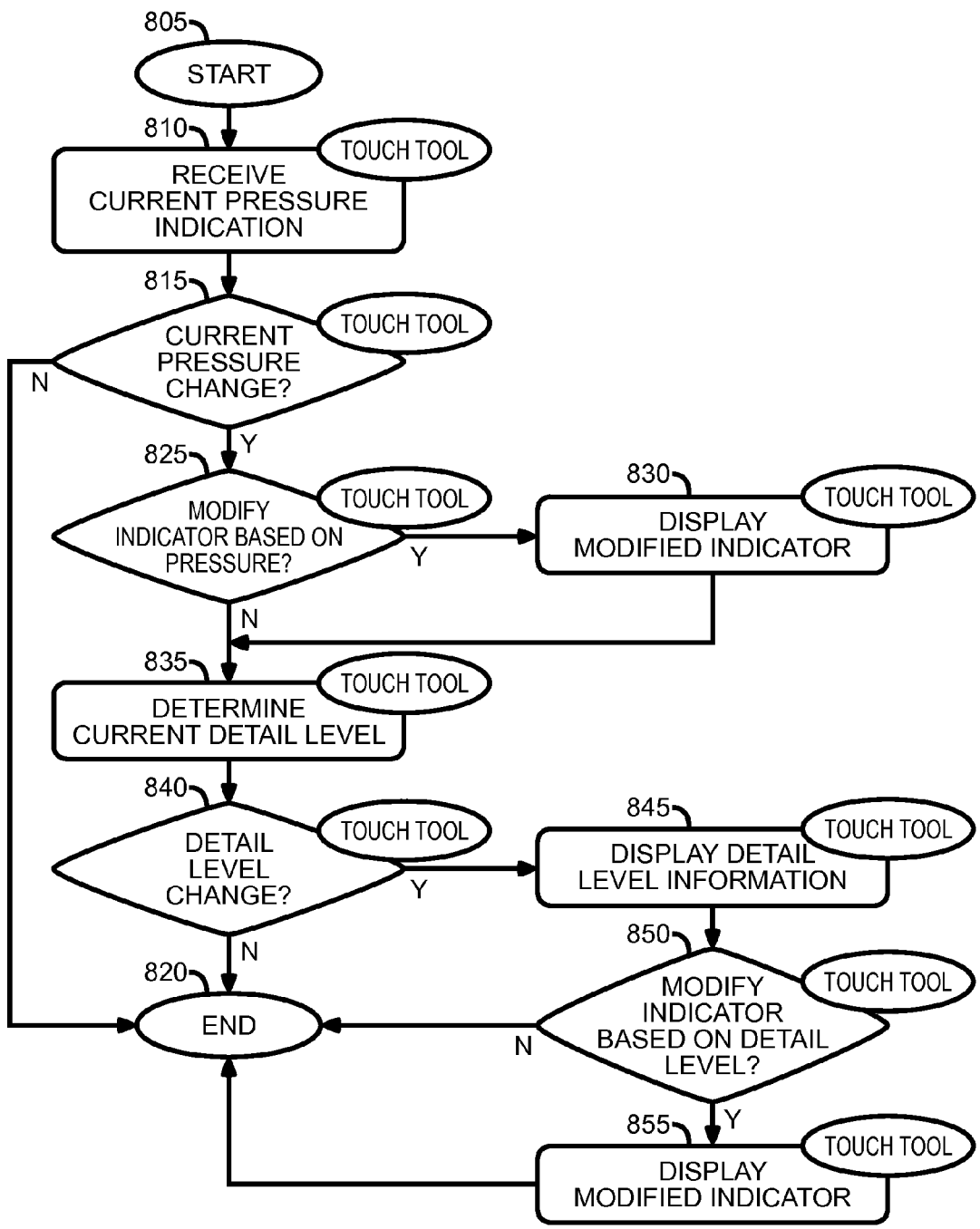
FIG. 8 is a flowchart that shows a representative process flow of a touch tool that may be used in the disclosed variable pressure touch system.

FIG. 8 is a flowchart that shows a representative process flow of a touch tool 800 that executes on IHS 200. In one embodiment, process flow commences when IHS 200 is switched on, as per start block 805. A user may touch, i.e., apply pressure to a touch sensor of IHS 200. Touch tool 800 may receive a current pressure indication from the touch sensor of IHS 200, as per block 810. Touch tool 800 determines if the current pressure indication differs from a prior pressure indication. If the current pressure indication does not differ, process flow may end, as per block 820. Alternatively, process flow may continue back to start block 805 and the process starts anew.

If touch tool 800 determines that the current pressure indication does change from the prior pressure indication, as per block 815, touch tool 800 may determine if the visual indicator should display information to the user indicating the current pressure of the touch on the touch sensor of IHS 200, as per block 825. In one embodiment, the touch tool 800 may utilize user preferences to determine if the visual indicator should display the current pressure of the touch on the touch sensor of IHS 200. If touch tool 800 determines that the visual indicator should not be modified based on the current pressure of the touch on the touch sensor, as per block 825, process flow continues at block 835.

If touch tool 800 determines that the visual indicator should be modified based on the current pressure of the touch on the touch sensor, as per block 825, touch tool 800 may display the modified visual indicator based upon the current pressure of the touch on the touch sensor, as per block 830. For example, the visual indicator may increase in size as the pressure indication increases. In another example, the visual indicator may decrease in size as the pressure indication decreases. Touch tool 800 may determine the current detail level based upon the current pressure indication, as per block 835. The current detail level may also be referred to as the particular detail level that corresponds to the current pressure indication. Touch tool 800 may determine if the current detail level differs from a prior detail level, as per block 840. If the current detail level does not differ from a prior detail level, as per block 840, process flow may end, as per block 820. Alternatively, process flow may continue back to start block 805 and the process starts anew.

If the current detail level does differ from a prior detail level, as per block 840, touch tool 800 may display detail level information on the display of IHS 200, as per block 845. In one embodiment, touch tool 800 may display detail level information inclusively, including the detail level information of prior detail levels, i.e. detail levels previously displayed. In another embodiment, touch tool 800 may display detail level information exclusively, i.e. displaying the detail level information corresponding to the current detail level without displaying detail level information of preceding detail levels. In yet another embodiment, touch tool 800 may display detail level information exclusively, only displaying the detail level information corresponding to the current detail level, but the pressure ranges of the detail levels may overlap, allowing two detail levels to be displayed concurrently. In another embodiment, touch tool 800 may display modified detail level information, wherein the touch tool may modify detail level information with respect to the current detail level.

Touch tool 800 may determine if the visual indicator should modify and display information to the user indicating the current detail level of the touch on the touch sensor of IHS 200, as per block 850. In one embodiment, the touch tool 800 may utilize user preferences to determine if the visual indicator should modify and display the current detail level of the touch on the touch sensor of IHS 200. If touch tool 800 determines that the visual indicator should not be modified based on the current detail level of the touch on the touch sensor, as per block 850, process flow ends, as per block 820. Alternatively, process flow may continue back to start block 805 and the process starts anew.

If touch tool 800 determines that the visual indicator should be modified based on the current detail level of the touch on the touch sensor, as per block 850, touch tool 800 may display the modified visual indicator based upon the current detail level of the touch on the touch sensor, as per block 855. Process flow ends, as per block 820. Alternatively, process flow may continue back to start block 805 and the process starts anew.

As will be appreciated by one skilled in the art, aspects of the disclosed methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the FIG. 8 flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart of FIG. 8 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart of FIG. 8 described above.

The flowchart of FIG. 8 illustrates the architecture, functionality, and operation of possible implementations of systems, methods and computer program products that perform analysis in accordance with various embodiments of the present invention. In this regard, each block in the flowcharts of FIG. 8 may represent a module, segment, or portion of code, which comprises one or more executable instructions for implementing the specified logical function(s). It should also be noted that, in some alternative implementations, the functions noted in the block may occur out of the order noted in FIG. 8. For example, two blocks shown in succession may, in fact, be executed substantially concurrently, or the blocks may sometimes be executed in the reverse order, depending upon the functionality involved. It will also be noted that each block of FIG. 8 and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   sensing a touch by a touch sensor of an information handling system (IHS);
   measuring, by the touch sensor, a current pressure exhibited by the touch on the touch sensor thereby generating a current pressure measure;
   receiving, by a touch tool of the IHS, the current pressure measure;
   generating, by the touch tool of the IHS, a display image, at a location on a display corresponding to the touch, which is a graphical representation of the current pressure measure, wherein the display image dynamically changes in response to the current pressure measure changing such that the display image remains a graphical representation of an amount of the current pressure measure, and wherein the graphical representation has a first configuration when a first amount of the current pressure measure is within a first range of pressure measurements and has a second configuration when a second amount of the current pressure measure is within a second range of pressure measurements different from the first range of pressure measurements; and
   displaying, by a display device of the IHS, the display image that changes as the current pressure measure changes, wherein displaying the display image further comprises displaying a graphical representation of an item of content of interest, wherein the item of content is an item available for purchase, wherein different levels of detailed information about the item of content are displayed depending upon the current pressure measure and the different levels of detailed information comprise different levels of information about the item available for purchase, and wherein the different levels of detailed information comprises:
      a first level of detailed information comprising a title of a document, which is displayed in response to the current pressure measure being within the first range of pressure measurements;
      a second level of detailed information comprising an image associated with the document, which is displayed in response to the current pressure measure being within the second range of pressure measurements; and
      a third level of detailed information comprising textual content of the document, which is displayed in response to the current pressure measure being within a third range of pressure measurements.

2. The method of claim 1, wherein the generating a display image step further comprises:
   generating a visual indicator in the display image around a point, on a display of a display device, associated with the sensed touch, the visual indicator increasing in size as the current pressure increases, and the visual indicator decreasing in size as the current pressure decreases.

3. The method of claim 2, wherein the visual indicator is situated adjacent a display location corresponding to where the touch sensor currently senses the touch.

4. The method of claim 1, further comprising determining, by the touch tool, a particular detail level of a plurality of detail levels, the particular detail level corresponding to the current pressure indication.

5. The method of claim 4, wherein the displaying the display image step includes displaying the particular detail level that corresponds to the current pressure indication.

6. A method, comprising:
   sensing a touch by a touch sensor of an information handling system (IHS);
   measuring, by the touch sensor, a current pressure exhibited by the touch on the touch sensor thereby generating a current pressure measure;
   receiving, by a touch tool of the IHS, the current pressure measure;
   generating, by the touch tool of the IHS, a display image, at a location on a display corresponding to the touch, which is a graphical representation of the current pressure measure, wherein the display image dynamically changes in response to the current pressure measure changing such that the display image remains a graphical representation of an amount of the current pressure measure, and wherein the graphical representation has a first configuration when a first amount of the current pressure measure is within a first range of pressure measurements and has a second configuration when a second amount of the current pressure measure is within a second range of pressure measurements different from the first range of pressure measurements; and
   displaying, by a display device of the IHS, the display image that changes as the current pressure measure changes, wherein displaying the display image further comprises displaying a graphical representation of an item of content of interest, wherein the item of content is an item available for purchase, wherein different levels of detailed information about the item of content are displayed depending upon the current pressure measure and the different levels of detailed information comprise different levels of information about the item available for purchase, and wherein the different levels of detailed information comprises:
      a first level of detailed information comprising at least one of a product name or a product price, which is displayed in response to the current pressure measure being within the first range of pressure measurements;
      a second level of detailed information comprising a detailed description of the item available for purchase, which is displayed in response to the current pressure measure being within the second range of pressure measurements; and
      a third level of detailed information comprising product options corresponding to the item available for purchase, which is displayed in response to the current pressure measure being within a third range of pressure measurements.

7. An information handling system (IHS), comprising:
   a processor:
   a system memory coupled to the processor, the system memory including a touch tool that is configured to:

sense a touch by a touch sensor;
measure, by the touch sensor, a current pressure exhibited by the touch on the touch sensor thereby generating a current pressure measure;
receive the current pressure measure;
generate a display image, at a location on a display corresponding to the touch, which is a graphical representation of the current pressure measure, wherein the display image dynamically changes in response to the current pressure measure changing such that the display image remains a graphical representation of an amount of the current pressure measure, and wherein the graphical representation has a first configuration when a first amount of the current pressure measure is within a first range of pressure measurements and has a second configuration when a second amount of the current pressure measure is within a second range of pressure measurements different from the first range of pressure measurements; and
display, by a display device of the IHS, the display image that changes as the current pressure measure changes, wherein displaying the display image further comprises displaying a graphical representation of an item of content of interest, wherein the item of content is an item available for purchase, wherein different levels of detailed information about the item of content are displayed depending upon the current pressure measure and the different levels of detailed information comprise different levels of information about the item available for purchase, and wherein the different levels of detailed information comprises:
a first level of detailed information comprising a title of a document, which is displayed in response to the current pressure measure being within the first range of pressure measurements;
a second level of detailed information comprising an image associated with the document, which is displayed in response to the current pressure measure being within the second range of pressure measurements; and
a third level of detailed information comprising textual content of the document, which is displayed in response to the current pressure measure being within a third range of pressure measurements.

8. A touch tool computer program product, comprising:
a non-transitory computer readable storage medium that stores program code for execution on a processor of an information handling system (IHS), the program code including:
first instructions that sense a touch by a touch sensor;
second instructions that measure, by the touch sensor, a current pressure exhibited by the touch on the touch sensor thereby generating a current pressure measure;
third instructions that receive the current pressure measure;
fourth instructions that generate a display image, at a location on a display corresponding to the touch, which is a graphical representation of the current pressure measure, wherein the display image dynamically changes in response to the current pressure measure changing such that the display image remains a graphical representation of an amount of the current pressure measure, and wherein the graphical representation has a first configuration when a first amount of the current pressure measure is within a first range of pressure measurements and has a second configuration when a second amount of the current pressure measure is within a second range of pressure measurements different from the first range of pressure measurements; and
fifth instructions that display, via a display device of the IHS, a display image that changes as the current pressure measure changes, wherein displaying the display image further comprises displaying a graphical representation of an item of content of interest, wherein the item of content is an item available for purchase, wherein different levels of detailed information about the item of content are displayed depending upon the current pressure measure and the different levels of detailed information comprise different levels of information about the item available for purchase, and wherein the different levels of detailed information comprises:
a first level of detailed information comprising a title of a document, which is displayed in response to the current pressure measure being within the first range of pressure measurements;
a second level of detailed information comprising an image associated with the document, which is displayed in response to the current pressure measure being within the second range of pressure measurements; and
a third level of detailed information comprising textual content of the document, which is displayed in response to the current pressure measure being within a third range of pressure measurements.

9. The touch tool computer program product of claim 8, wherein displaying the display image further comprises displaying a graphical representation of an item of content of interest, and wherein different levels of detailed information about the item of content are displayed depending upon the current pressure measure.

10. The touch tool computer program product of claim 9, wherein the item of content is an item available for purchase, and wherein the different levels of detailed information comprise different levels of information about the item available for purchase.

11. An information handling system (IHS), comprising:
a processor:
a system memory coupled to the processor, the system memory including a touch tool that is configured to:
sense a touch by a touch sensor;
measure, by the touch sensor, a current pressure exhibited by the touch on the touch sensor thereby generating a current pressure measure;
receive the current pressure measure;
generate a display image, at a location on a display corresponding to the touch, which is a graphical representation of the current pressure measure, wherein the display image dynamically changes in response to the current pressure measure changing such that the display image remains a graphical representation of an amount of the current pressure measure, and wherein the graphical representation has a first configuration when a first amount of the current pressure measure is within a first range of pressure measurements and has a second configuration when a second amount of the current pressure measure is within a second range of pressure measurements different from the first range of pressure measurements; and
display, by a display device of the IHS, the display image that changes as the current pressure measure changes, wherein displaying the display image further comprises displaying a graphical representation of an item of content of interest, wherein the item of content is an item available for purchase, wherein different levels of detailed information about the item of content are displayed depending upon the current pressure measure and the different levels of detailed information comprise different levels of information about the item available for purchase, and wherein the different levels of detailed information comprises:
  a first level of detailed information comprising at least one of a product name or a product price, which is displayed in response to the current pressure measure being within the first range of pressure measurements;
  a second level of detailed information comprising a detailed description of the item available for purchase, which is displayed in response to the current pressure measure being within the second range of pressure measurements; and
  a third level of detailed information comprising product options corresponding to the item available for purchase, which is displayed in response to the current pressure measure being within a third range of pressure measurements.

12. A touch tool computer program product, comprising:
a non-transitory computer readable storage medium that stores program code for execution on a processor of an information handling system (IHS), the program code including:
first instructions that sense a touch by a touch sensor;
second instructions that measure, by the touch sensor, a current pressure exhibited by the touch on the touch sensor thereby generating a current pressure measure;
third instructions that receive the current pressure measure;
fourth instructions that generate a display image, at a location on a display corresponding to the touch, which is a graphical representation of the current pressure measure, wherein the display image dynamically changes in response to the current pressure measure changing such that the display image remains a graphical representation of an amount of the current pressure measure, and wherein the graphical representation has a first configuration when a first amount of the current pressure measure is within a first range of pressure measurements and has a second configuration when a second amount of the current pressure measure is within a second range of pressure measurements different from the first range of pressure measurements; and
fifth instructions that display, via a display device of the IHS, a display image that changes as the current pressure measure changes, wherein displaying the display image further comprises displaying a graphical representation of an item of content of interest, wherein the item of content is an item available for purchase, wherein different levels of detailed information about the item of content are displayed depending upon the current pressure measure and the different levels of detailed information comprise different levels of information about the item available for purchase, and wherein the different levels of detailed information comprises:
a first level of detailed information comprising at least one of a product name or a product price, which is displayed in response to the current pressure measure being within the first range of pressure measurements;
a second level of detailed information comprising a detailed description of the item available for purchase, which is displayed in response to the current pressure measure being within the second range of pressure measurements; and
a third level of detailed information comprising product options corresponding to the item available for purchase, which is displayed in response to the current pressure measure being within a third range of pressure measurements.

* * * * *